US010323608B2

(12) United States Patent
Habib et al.

(10) Patent No.: US 10,323,608 B2
(45) Date of Patent: Jun. 18, 2019

(54) COMBUSTION SYSTEM WITH AN ION TRANSPORT MEMBRANE ASSEMBLY AND A METHOD OF USING THEREOF

(71) Applicant: KING FAHD UNIVERSITY OF PETROLEUM AND MINERALS, Dhahran (SA)

(72) Inventors: Mohamed Abdel-Aziz Mostafa Habib, Dhahran (SA); Medhat Nemitallah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 335 days.

(21) Appl. No.: 15/371,540

(22) Filed: Dec. 7, 2016

(65) Prior Publication Data

US 2017/0234280 A1    Aug. 17, 2017

Related U.S. Application Data

(60) Provisional application No. 62/295,908, filed on Feb. 16, 2016.

(51) Int. Cl.
*F02M 35/10* (2006.01)
*F02M 26/04* (2016.01)
(Continued)

(52) U.S. Cl.
CPC ......... *F02M 35/10301* (2013.01); *F01N 5/02* (2013.01); *F01N 5/04* (2013.01);
(Continued)

(58) Field of Classification Search
CPC .. F01N 5/02; F01N 5/04; F02M 26/04; F02M 26/22; F02M 26/35; F02M 35/10301;
(Continued)

(56) References Cited

U.S. PATENT DOCUMENTS

| 3,712,060 | A | 1/1973 | Sorrenti |
| 3,818,886 | A | 6/1974 | Blaszczynski |

(Continued)

FOREIGN PATENT DOCUMENTS

| EP | 2 299 090 A2 | 3/2011 |
| KR | 10-2016-0090193 | 7/2016 |
| WO | WO 2004/046523 A2 | 6/2004 |

OTHER PUBLICATIONS

Robert Steele, et al., "Integration of Ion Transport Membrane Technology with Oxy-Combustion Power Generation Systems", 2$^{nd}$ Oxyfuel Combustion Conference, 2011, 3 pages.

(Continued)

*Primary Examiner* — Audrey K Bradley
*Assistant Examiner* — Dapinder Singh
(74) *Attorney, Agent, or Firm* — Oblon, McClelland, Maier & Neustadt, L.L.P.

(57) ABSTRACT

A combustion system including an ion transport membrane assembly coupled to an internal combustion engine to generate power via oxy-combusting a fuel stream in a combustion chamber of the internal combustion engine, and a method of combusting the fuel stream via the combustion system, wherein a portion of an exhaust stream is recycled to the ion transport membrane assembly. Various embodiments of the combustion system and the method of combusting the fuel stream are disclosed.

15 Claims, 18 Drawing Sheets

(51) Int. Cl.
*F01N 5/02* (2006.01)
*F02M 26/35* (2016.01)
*F02M 26/22* (2016.01)
*F01N 5/04* (2006.01)

(52) U.S. Cl.
CPC ............ *F02M 26/04* (2016.02); *F02M 26/22* (2016.02); *F02M 26/35* (2016.02)

(58) Field of Classification Search
CPC .. B01D 2257/504; B01D 17/00; B01D 61/00; B01D 63/00; B01D 69/00; B01D 71/00
USPC .............. 60/274, 287, 288, 297, 311, 605.2; 95/52, 54
See application file for complete search history.

(56) References Cited

U.S. PATENT DOCUMENTS

| | | | |
|---|---|---|---|
| 3,886,734 A | 6/1975 | Johnson | |
| 4,489,559 A | 12/1984 | Fawcett et al. | |
| 4,509,464 A | 4/1985 | Hansen | |
| 5,639,437 A | 6/1997 | Balachandran et al. | |
| 5,649,517 A * | 7/1997 | Poola | B01J 19/088 123/585 |
| 5,938,822 A | 8/1999 | Chen et al. | |
| 6,033,632 A | 3/2000 | Schwartz et al. | |
| 6,289,884 B1 * | 9/2001 | Blandino | F02M 25/12 123/585 |
| 6,516,771 B1 * | 2/2003 | Brown | F01M 9/02 123/196 R |
| 6,516,787 B1 * | 2/2003 | Dutart | F02M 25/12 123/539 |
| 6,523,529 B1 * | 2/2003 | Moncelle | F02M 25/12 123/539 |
| 6,539,719 B2 | 4/2003 | Prasad et al. | |
| 6,543,428 B1 * | 4/2003 | Blandino | F02M 33/00 123/585 |
| 6,722,352 B2 | 4/2004 | Smolarek et al. | |
| 7,100,543 B2 * | 9/2006 | Davidson | B01D 53/22 123/26 |
| 7,337,770 B2 * | 3/2008 | Moon | F02D 19/12 123/585 |
| 7,377,272 B2 * | 5/2008 | Davidson | B01D 53/22 123/26 |
| 8,141,360 B1 | 3/2012 | Huber | |
| 8,956,154 B2 | 2/2015 | Siljan | |
| 9,004,909 B2 | 4/2015 | Ghoniem et al. | |
| 9,074,559 B2 | 7/2015 | Nemitallah et al. | |
| 9,745,927 B2 * | 8/2017 | Powell | F02M 35/10242 |
| 2003/0015185 A1 * | 1/2003 | Dutart | B01D 53/22 123/585 |
| 2003/0159663 A1 | 8/2003 | Zagaja et al. | |
| 2009/0183491 A1 | 7/2009 | Hofbauer | |
| 2015/0260105 A1 | 9/2015 | Nemitallah et al. | |

OTHER PUBLICATIONS

Yantovski E., et al., "Zero Emission Fuel-Fired Power Plant With Ion Transport Membrane", Energy, vol. 29, Issues 12-15, Oct.-Dec. 2004, 20 pages.

Mancini ND, et al., "Conceptual design and analysis of ITM oxy-combustion power cycles", Phys. Chem. Chem. Phys., vol. 13, No. 48, Dec. 28, 2011, pp. 21351-21361 (Abstract only).

Kirsten Foy, et al., "Analysis of the effects of combining air separation with combustion in a zero emissions (ZEITMOP) cycle", Energy Conversion and Management, vol. 48, Issue 11, Nov. 2007, pp. 3046-3052 (Abstract only).

Abass A. Olajire, "$CO_2$ capture and separation technologies for end-of-pipe applications—A review", Energy, vol. 35, 2010, pp. 2610-2628.

Simon Perry, et al., "Integrating waste and renewable energy to reduce the carbon footprint of locally integrated energy sectors", Energy, vol. 33, Issue 10, Oct. 2008, pp. 1489-1497 (Abstract only).

Mario Amelio, et al., "Integrated gasification gas combined cycle plant with membrane reactors: Technological and economical analysis", Energy Conversion and Management, vol. 48, 2007, pp. 2680-2693.

M. Cumo, et al., "Energia, cambiamenti climatici e sequestro dell'anidride carbonica", Rivista La Termotecnica—Accesso Riservato Soci CTI, No. 5, 2003, pp. 33-43 (Abstract only) (with English translation of Abstract).

M. A. Nemitallah, et al., "Design of an ion transport membrane reactor for gas turbine combustion application", Journal of Membrane Science, Jan. 2014, 34 pages.

Mark C. Woods, et al., "Cost and Performance Baseline for Fossil Energy Plants", Bituminous Coal and Natural Gas to Electricity, Final Report, vol. 1, May 2007, 508 pages.

Pervez Ahmed, et al., "CFD (computational fluid dynamics) analysis of a novel reactor design using ion transport membranes for oxy-fuel combustion", Energy, vol. 77. 2014, pp. 932-944.

Jinsoo Kim, et al., "Synthesis and oxygen-permeation properties of thin YSZ/Pd composite membranes", Aiche Journal, vol. 46, Issue 8, Aug. 2000, pp. 1521-1529 (Abstract only).

Jongsup Hong, et al., "Interactions Between Oxygen Permeation and Homogeneous-Phase Fuel Conversion on the Sweep Side of an Ion Transport Membrane", Journal of Membrane Science, vol. 428, Feb. 2013, pp. 309-322.

* cited by examiner

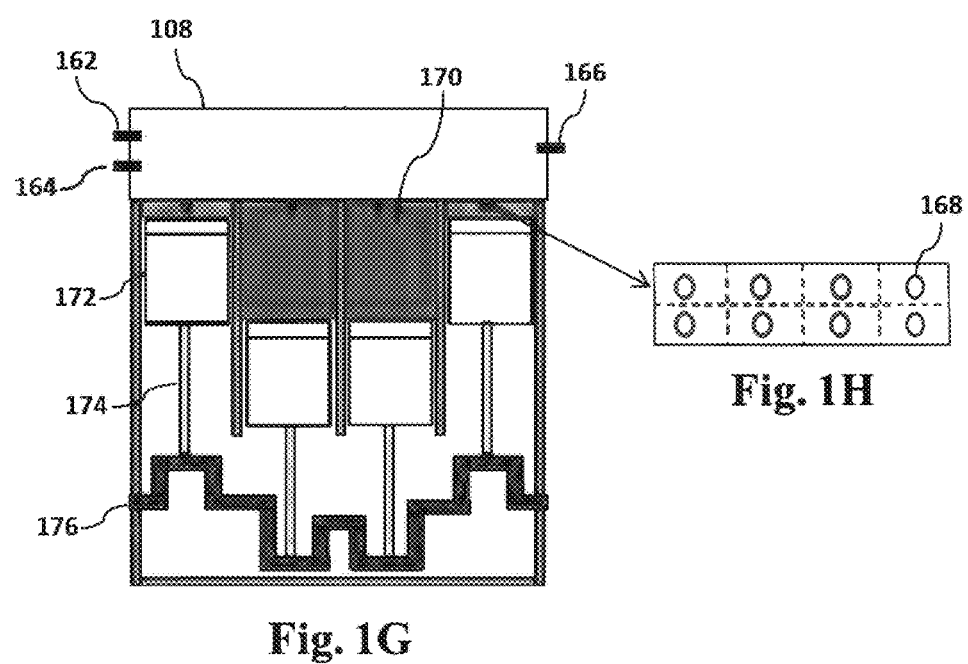

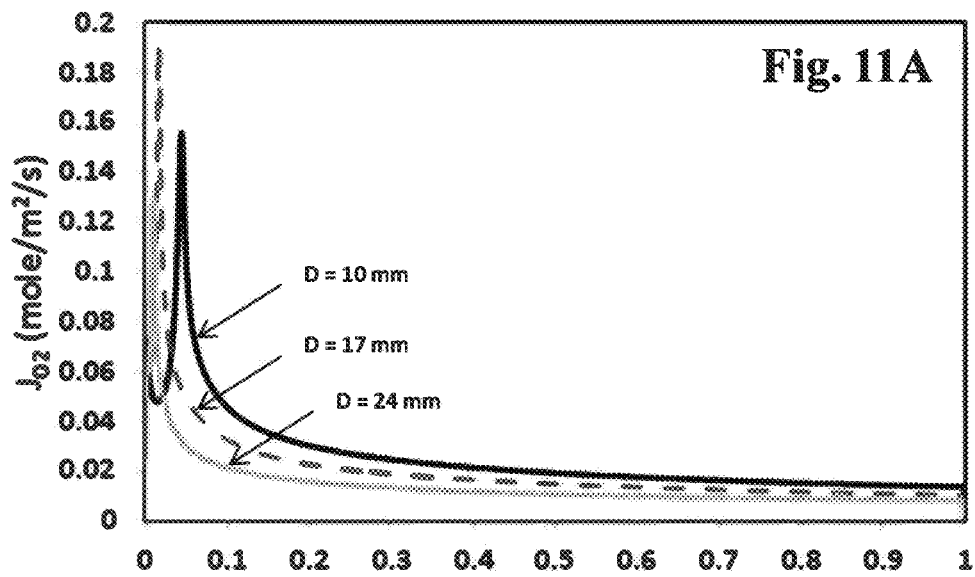
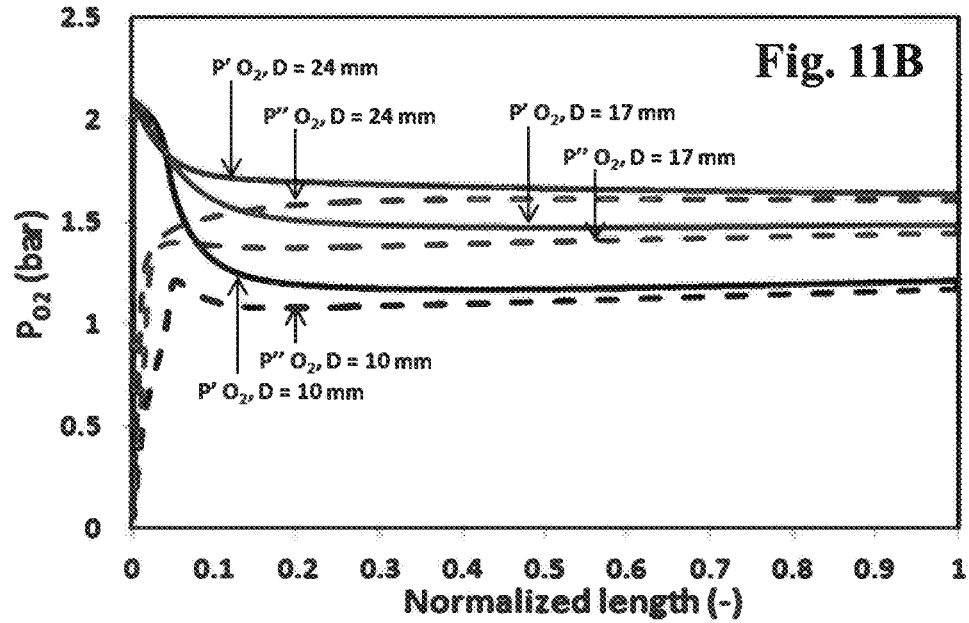

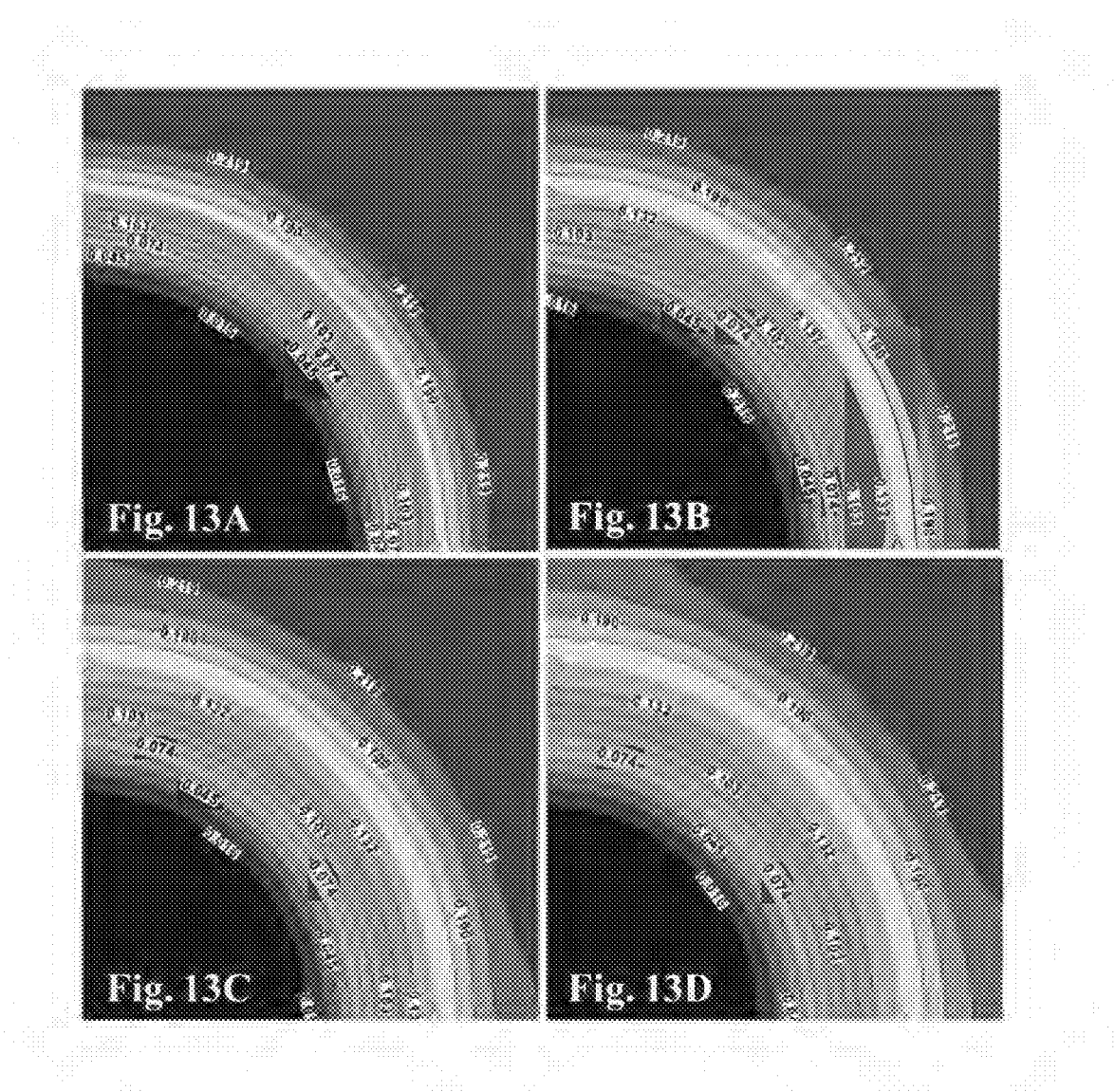

COMBUSTION SYSTEM WITH AN ION TRANSPORT MEMBRANE ASSEMBLY AND A METHOD OF USING THEREOF

CROSS REFERENCE TO RELATED APPLICATIONS

This application claims the benefit of U.S. Provisional Application No. 62/295,908 filed Feb. 16, 2016 which is incorporated herein by reference in its entirety.

BACKGROUND OF THE INVENTION

Technical Field

The present invention relates to a combustion system including an ion transport membrane assembly coupled to an internal combustion engine to generate power via oxy-combusting a fuel stream. The present invention further relates to a method of combusting a fuel stream via the combustion system.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Energy consumptions continue to rise, thus producing more emissions of $CO_2$ [Olajire AA, $CO_2$ capture and separation technologies for end-of-pipe applications—a review, Energy, 2010, 35, 2610-2628]. Carbon capture from point source emissions has been recognized as one of several strategies necessary for mitigating the unfettered release of greenhouse gases (GHGs) into the atmosphere. To keep GHGs at manageable levels, a drastic reduction in $CO_2$ emissions may be needed through capturing and separation [Perry S, Klemeš J, Bulatov 1. Integrating waste and renewable energy to reduce the carbon footprint of locally integrated energy sectors, Energy, 2008, 33, 1489-1497]. World population growth and the consequent rise in pollution and greenhouse gases emissions are among the challenging problems that the scientific community must solve in the near future [Amelio M, Morrone P, Gallucci F, Basile A. Integrated gasification gas combined cycle plant with membrane reactors: Technological and economical analysis, Energy Conversion and Management, 2007, 48, 2680-2693]. The energy production from fossil fuel sources represents a large portion (about 65%) of the total greenhouse gases emissions (carbon dioxide $CO_2$, methane $CH_4$ and nitrogen oxide $N_2O$) [Cumo M, Santi F, Simboletti G. Energia, cambiamenti climaticie sequestro dell'anidride carbonica, La Termotecnica, 2003, 33-43]. Besides, mobile sources such as internal combustion engines represent more than 25% of the total $CO_2$ emissions. Most scientists agree that there is a strong connection between climate change and the anthropogenic emissions of greenhouse gases, of which $CO_2$ is by far the most important gas in terms of the amount emitted. Carbon dioxide is the major atmospheric contaminant leading to a temperature increase due to the greenhouse effect. The scientific community considers the anthropogenic $CO_2$ emission needed to maintain the existing world climate condition. As a result, radical changes in fossil fuel-operated technologies are needed.

Oxy-combustion is among one of the most promising carbon capture technologies. Accordingly, a hydrocarbon fuel is burned in a nearly pure oxygen atmosphere, or in a nitrogen-free atmosphere. In view of that, the products of the combustion consist of a mixture of only carbon dioxide and water vapor [Nemitallah, M. A Habib, M. A., Ben-mansour, R., Ghoniem, A. F., Design of an ion transport membrane reactor for gas turbine combustion application, Journal of membrane science, 2014, 450, 60-71]. Water vapor can easily be condensed and the resulting carbon dioxide can be captured for industrial purposes, or it can be stored. Although this technology is applicable to conventional combustion systems it needs an oxygen-separating system, wherein oxygen is separated from air or another oxygen-containing stream. Having an oxygen-separating system as a separate unit for removing undesired substances in oxy-combustion consumes a portion of the output power generated by the combustion system [Haslbeck, J., Capicotto, P., Juehn, N., Lewis, E Rutkowski, M., Woods, M., et al., bituminous coal to electricity, Washington D.C., DOE/NETL-1291, 2007]. Therefore, utilizing the oxygen-separating system in a combustion system is not an efficient way to turn a combustion system into an oxy-combustion system.

A new approach for oxy-combusting a fuel has been recently disclosed via the use of ion transport membrane reactors (OTMR). In these reactors, oxygen is separated from a gaseous mixture (generally air) at a temperature ranging from 650° C. to 950° C., and a fuel is oxy-combusted in the presence of the separated oxygen [Ahmed, P., Habib, M. A., Ben-Mansour, R., Kirchen, P., Ghoniem, A. F., CFD (computational fluid dynamics) analysis of a novel reactor design using ion transport membranes for oxy-fuel combustion, Energy, 2014, 77, 932-944]. Alternatively, fuel can also be burned in the presence of the separated oxygen and recycled carbon dioxide, in the permeate side of the membrane. Several membrane materials were shown to effectively separate oxygen from a gaseous mixture. Among those, lanthanum cobaltite perovskite ceramics, modified proviskite ceramics [Balachandran, U., Kleefisch, M. S., Kobylinski, T. P., Morissette, S. L., Pei, S Oxygen ion-conducting dense ceramic membranes, US Patent, 1997, 5, 639-437], brownmillerite structured ceramics [Schwartz, M., White, J. H., Sammels, A. F., Solid state oxygen anion and electron mediating membrane and catalytic membrane reactors containing them, US Patent, 2000, 6, 033-632], ceramic metal dual phase membranes [Chen, C. C., Prasad, R., Gottzmann, C. F., Solid electrolyte membrane with porous catalytically-enhancing constituents (assigned to praxair technology), US Patent, 1999, 5, 938-822], and thin duel phase membranes, which consists of chemically stable yttria-stabilized zirconia (YSZ), [Kim, J., Lin, Y. S., Synthesis and oxygen permeation properties of thin YSZ/Pd composite membranes, AIChE Journal, 2000, 46, 1521] have been comprehensively investigated.

In view of the forgoing, one objective of the present invention is to provide a combustion system including an ion transport membrane assembly coupled to an internal combustion engine to generate power via oxy-combusting a fuel stream in a combustion chamber of the internal combustion engine. The ion transport membrane assembly includes a plurality of ion transport membranes, wherein each separates molecular oxygen from a gaseous mixture exposed thereon. Another objective of the present invention is to provide a method of combusting a fuel stream via the combustion system, wherein a portion of an exhaust stream is recycled to sweep the molecular oxygen away from a plurality of permeate zones of the ion transport membrane assembly.

BRIEF SUMMARY OF THE INVENTION

According to a first aspect the present disclosure relates to a combustion system, including i) an ion transport membrane assembly including a) a vessel with an internal cavity, b) a plurality of ion transport membranes that separate the internal cavity into a feed zone and a plurality of permeate zones, wherein the feed zone has a feed inlet and a feed outlet and each permeate zone has a sweep inlet and a sweep outlet, ii) a combustion chamber including a) an oxygen inlet, b) a fuel inlet, c) at least one exhaust outlet, wherein the combustion chamber is located downstream of and fluidly connected to the sweep outlet of the plurality of permeate zones via an oxygen line, iii) a recycle line that fluidly connects the at least one exhaust outlet to the sweep inlet of the plurality of permeate zones.

In one embodiment, the combustion system further includes a turbocharger including a) a compressor fluidly connected to the oxygen line, wherein the compressor is located downstream of the sweep outlet of the plurality of permeate zones and upstream of the oxygen inlet of the combustion chamber, b) a turbine fluidly connected to the at least one exhaust outlet via an exhaust line, wherein the compressor and the turbine are coupled via a shaft.

In one embodiment, the combustion system further includes i) at least one compartment, ii) at least one piston slidably disposed inside the at least one compartment, iii) a crack shaft coupled to the at least one piston, iv) a plurality of apertures disposed on the at least one compartment to fluidly connect said compartment to the combustion chamber, v) a plurality of valves disposed in the plurality of apertures.

In one embodiment, the combustion system further includes a heat exchanger located upstream of and fluidly connected to the feed inlet of the feed zone via a feed line and downstream of and fluidly connected to the turbine via the exhaust line, wherein the heat exchanger is configured to heat exchange the oxygen-containing stream with the exhaust stream.

In one embodiment, the combustion system further includes i) a condenser located downstream of and fluidly connected to the heat exchanger via the exhaust line configured to separate a liquid phase from the exhaust stream, ii) a $CO_2$ line that fluidly connects the condenser to the sweep inlet of the plurality of permeate zones.

In one embodiment, the vessel is cylindrical with a first and a second end separated by a side wall along a longitudinal axis of the vessel, and the feed inlet, the feed outlet, the sweep inlet, and the sweep outlet of the plurality of permeate zones are located on the first end of the vessel.

In one embodiment, the vessel is cylindrical with a first and a second end separated by a side wall along a longitudinal axis of the vessel, and the feed inlet and the feed outlet are located on the first end of the vessel, and the sweep inlet and the sweep outlet of the plurality of permeate zones are located on the second end of the vessel.

In one embodiment, the vessel is cylindrical with a first and a second end separated by a side wall along a longitudinal axis of the vessel, and the feed inlet and the sweep outlet of the plurality of permeate zones are located on the first end, and the feed outlet and the sweep inlet of the plurality of permeate zones are located on the second end of the vessel.

In one embodiment, the vessel is cylindrical with a first and a second end separated by a side wall along a longitudinal axis of the vessel, and the feed inlet and the sweep inlet of the plurality of permeate zones are located on the first end, and the feed outlet and the sweep outlet of the plurality of permeate zones are located on the second end of the vessel.

In one embodiment, the vessel is cylindrical with a first and a second end separated by a side wall along a longitudinal axis of the vessel, and each of the plurality of ion transport membranes has a longitudinal axis which is substantially parallel to the longitudinal axis of the vessel.

In one embodiment, each of the plurality of ion transport membranes is an elongated tube having a diameter in the range of 5 to 50 mm, a length in the range of 0.5 to 5 m, and a wall thickness in the range of 0.5 to 3.5 mm.

In one embodiment, at least five ion transport membranes are disposed inside the vessel with an inter-membrane distance of at least 10 mm.

According to a second aspect the present disclosure relates to a method of combusting a fuel stream, involving i) delivering an oxygen-containing stream to a feed zone of an ion transport membrane assembly, wherein molecular oxygen present in the oxygen-containing stream is transported across a plurality of ion transport membranes to a plurality of permeate zones of the ion transport membrane assembly, ii) delivering the molecular oxygen present in the plurality of permeate zones to a combustion chamber, iii) delivering the fuel stream to the combustion chamber to combust the fuel stream with the molecular oxygen to form an exhaust stream comprising carbon dioxide and water vapor, iv) flowing a portion of the exhaust stream comprising carbon dioxide and water vapor into the plurality of permeate zones of the ion transport membrane assembly to form an oxygen-enriched stream comprising the molecular oxygen, carbon dioxide, and optionally water vapor, v) delivering the oxygen-enriched stream to the combustion chamber.

In one embodiment, the method of combusting further involves i) mixing the oxygen-enriched stream with the fuel stream to form a combustion mixture, i) delivering the combustion mixture to the combustion chamber.

In one embodiment, carbon dioxide and water vapor are present in the exhaust stream, and the method of combusting further involves i) cooling the exhaust stream via a condenser to form a liquid phase in the exhaust stream, ii) separating the liquid phase from the exhaust stream to form a $CO_2$ stream and a water stream, iii) flowing a portion of the $CO_2$ stream into the plurality of permeate zones to form the oxygen-enriched stream comprising the molecular oxygen and carbon dioxide.

In one embodiment, the method of combusting further involves expanding the exhaust stream in an expander to generate power.

In one embodiment, the method of combusting further involves heat exchanging the oxygen-containing stream with the exhaust stream via a heat exchanger, prior to delivering the oxygen-containing stream to the feed zone.

In one embodiment, the exhaust stream is flowed into the plurality of permeate zones in a direction counter-current to the flow of the oxygen-containing stream in the feed zone.

In one embodiment, the exhaust stream is flowed into the plurality of permeate zones in a direction co-current to the flow of the oxygen-containing stream in the feed zone.

In one embodiment, an oxygen-depleted stream having a pressure in the range of 1 to 10 bars egresses the feed zone, and the method of combusting further involves expanding the oxygen-depleted stream in an expander to generate power.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1G illustrates an internal combustion engine of the combustion system.

FIG. 1H is a top-view of a cross-section of the internal combustion engine, wherein a combustion chamber and a plurality of compartments join together.

FIG. 11A represents an axial distribution of the oxygen permeation flux of the ion transport membrane assembly, at different diameters of the ion transport membranes.

FIG. 11B represents an axial distribution of the oxygen partial pressure in the feed and the permeate zones of the ion transport membrane assembly, at different diameters of the ion transport membranes.

FIG. 13A represents a contour plot of an oxygen mass fraction on a plane normal to the flow direction at an axial location of Z=0.4 m.

FIG. 13B represents a contour plot of an oxygen mass fraction on a plane normal to the flow direction at an axial location of Z=0.8 m.

FIG. 13C represents a contour plot of an oxygen mass fraction on a plane normal to the flow direction at an axial location of Z=1.2 m.

FIG. 13D represents a contour plot of an oxygen mass fraction on a plane normal to the flow direction at an axial location of Z=1.6 m.

DETAILED DESCRIPTION OF THE EMBODIMENTS

Figure 1A:
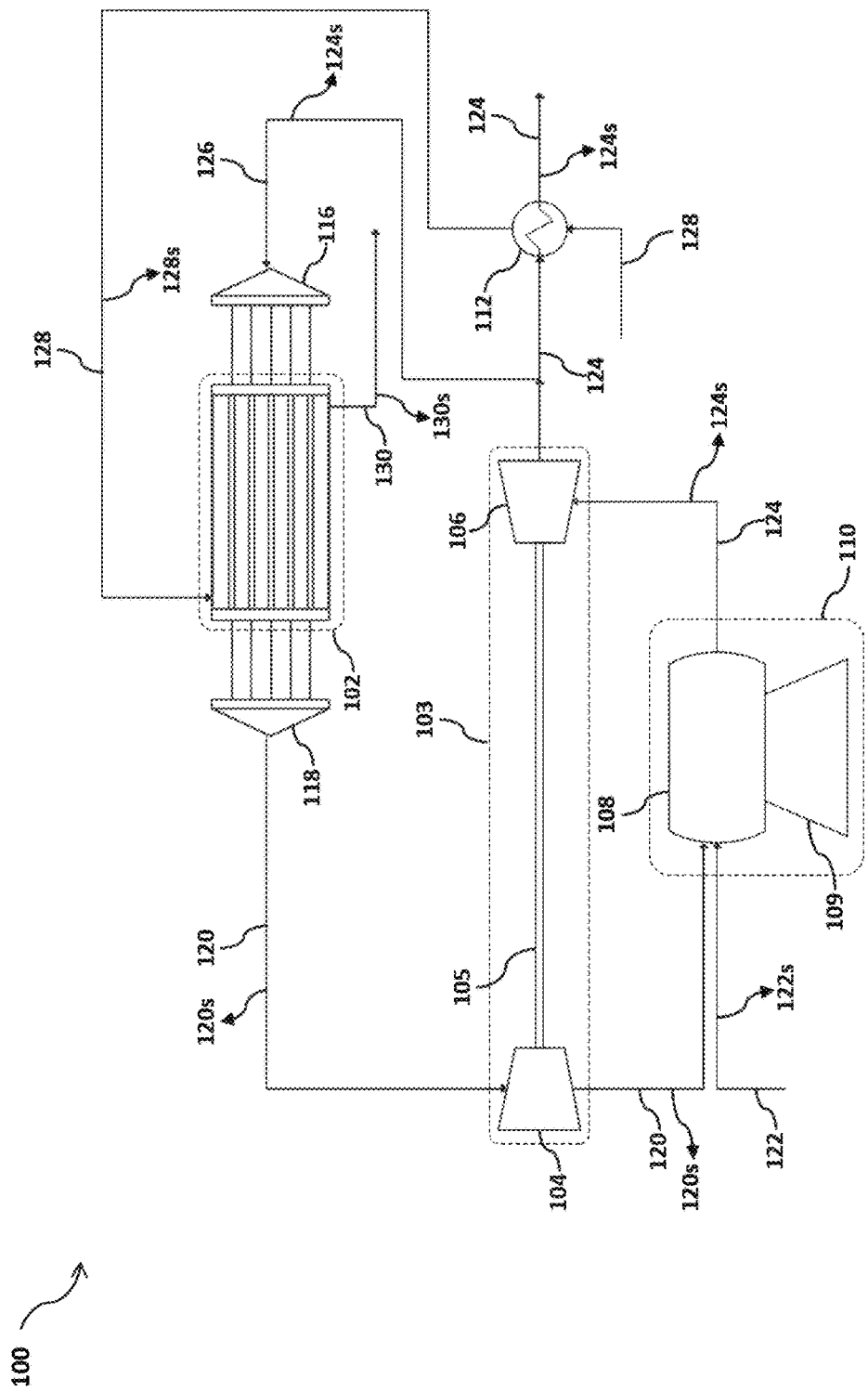
FIG. 1A is a process flow diagram of a combustion system.

Referring now to the drawings, wherein like reference numerals designate identical or corresponding parts throughout the several views.

Figure 1B:
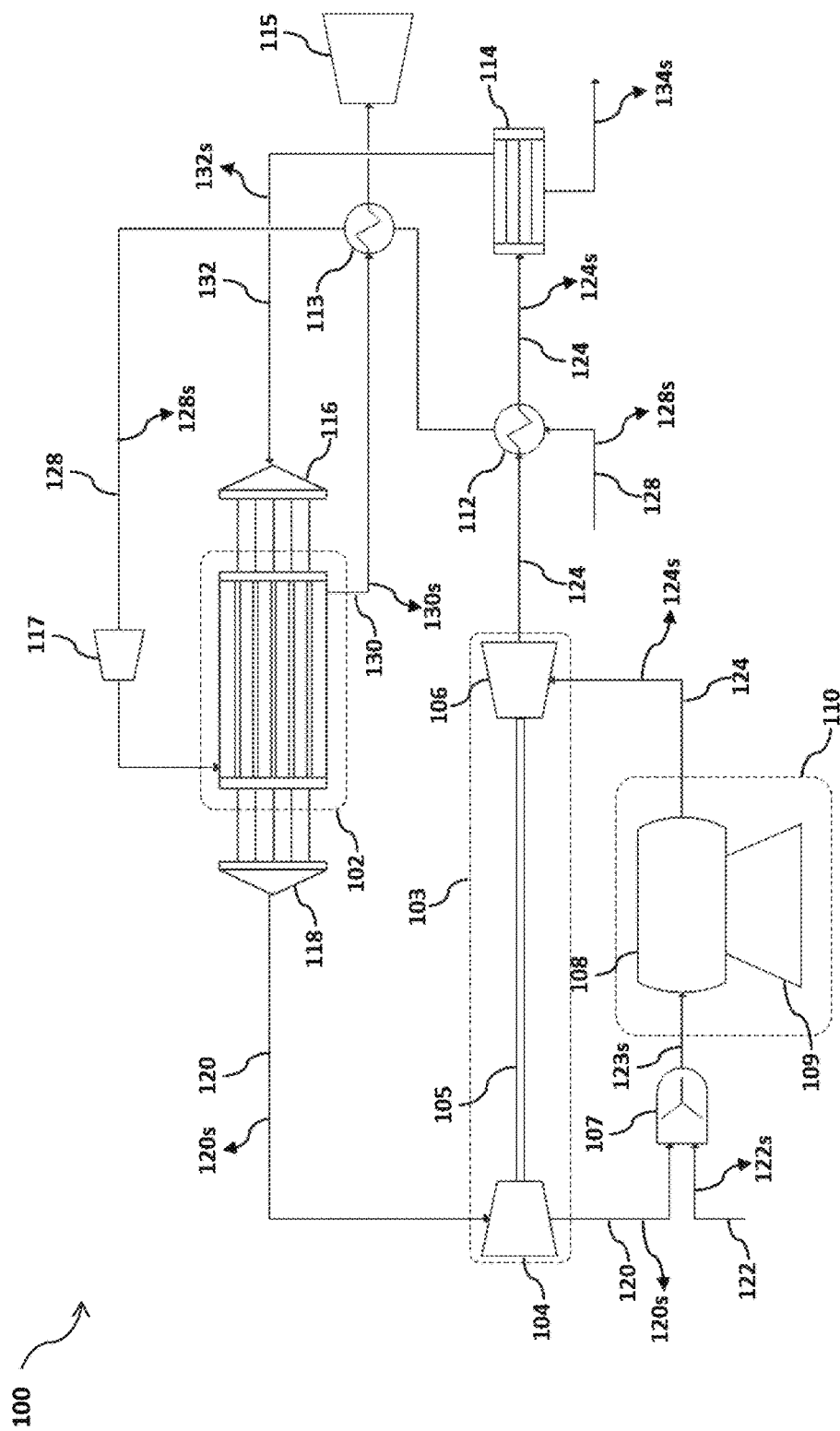
FIG. 1B is a process flow diagram of the combustion system in an alternative embodiment.

According to a first aspect the present disclosure relates to a combustion system 100, including an ion transport membrane assembly 102 (as shown in FIGS. 1A and 1B).

Figure 1C:
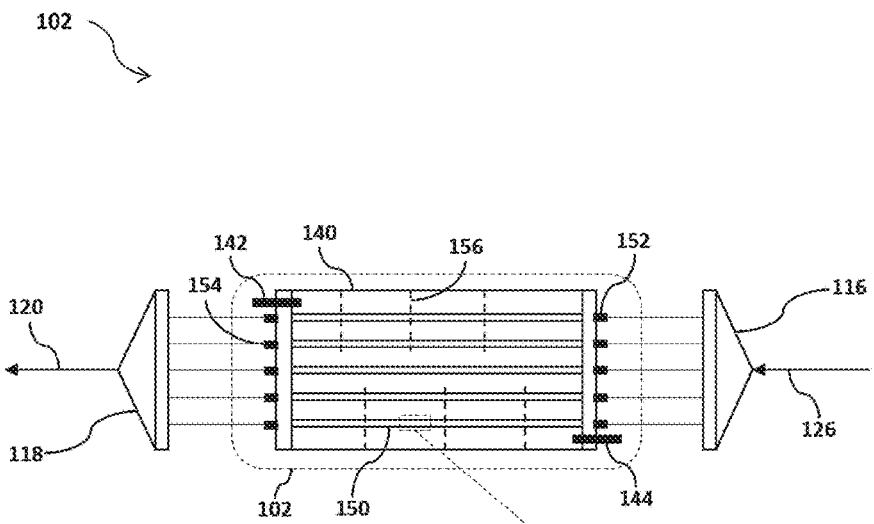
FIG. 1C illustrates an ion transport membrane assembly of the combustion system.

The term "ion transport membrane assembly" as used herein refers to an assembly having at least a vessel 140 with an internal cavity and a plurality of ion transport membranes 150, configured to separate molecular oxygen from an oxygen-containing stream 128s. Accordingly, the plurality of ion transport membranes (ITMs) are disposed inside the vessel 140 such that the internal cavity is separated into a feed zone 146 and a plurality of permeate zones 148 (as shown in FIGS. 1A, 1B, and 1C).

The vessel 140 refers to a compartment having an internal cavity, configured to hold a gaseous mixture at elevated temperatures and pressures, preferably, at a temperature in the range of 800-1,500° C., more preferably 800-1,200° C., even more preferably 800-1,000° C. The vessel 140 may hold the gaseous mixture at elevated pressures in the range of 1-50 bars, preferably 10-30 bars, more preferably 10-20 bars.

In one embodiment, the vessel 140 may be made of quartz, stainless steel, nickel steel, chromium steel, aluminum, aluminum alloy, copper and copper alloys, titanium, and the like. In a preferred embodiment, the vessel 140 is made of a high-temperature duty ceramic composite that can endure a temperature of up to 1,200° C., preferably up to 1,500° C., more preferably up to 2,000° C. Exemplary high-temperature duty ceramic composite may include, but not limited to, borides, carbides, nitrides, and oxides of transition metals selected from the group consisting of Al, Si, Sc, Ti, V, Cr, Zr, Nb, Mo, Hf, Ta, and Th, for example, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), tantalum carbide (TaC), and composites thereof. In another preferred embodiment, the vessel is made of a metal or an alloy such as stainless steel, nickel steel, chromium steel, aluminum, aluminum alloy, copper and copper alloys, titanium, and the like, and an interior surface of the vessel may be coated with an oxidation resistant layer to minimize internal surface oxidation. For example, the interior surface of the vessel may be coated with the high-temperature duty ceramic composite, quartz, alumina, Pyrex®, and the like. Although the materials used to construct the vessel are not meant to be limiting and various other materials may also be used.

In one embodiment, the vessel 140 is rectangular having an internal volume in the range of 0.01-50 $m^3$, or preferably 0.1-20 $m^3$, or preferably 1-10 $m^3$, or preferably 1-5 $m^3$. Accordingly, the rectangular vessel has a length (L), a width (W), and a height (H), wherein the length-to-width ratio (i.e. L/W) may be in the range of 1-20, preferably 1-10, more preferably 1-5, and wherein the height-to-length ratio (i.e. H/L) may be in the range of 0.05-1, preferably 0.1-0.5, more preferably 0.1-0.4, even more preferably 0.1-0.3, and most preferably about 0.2. According to this embodiment, the vessel has a longitudinal axis parallel to a ground surface. In a preferred embodiment, the vessel 140 is cylindrical, which is vertically or preferably horizontally oriented. For example, the vessel may be a portion of a pipe. The vessel 140 may also have other geometries including, but not limited to, cylindrical, spherical, oblong, conical, and pyramidal.

In some preferred embodiments, the vessel 140 is rectangular or preferably cylindrical with a first and a second end separated by a side wall along a longitudinal axis of the vessel, and each of the plurality of ion transport membranes 150 has a longitudinal axis which is substantially parallel to the longitudinal axis of the vessel. Preferably, at least five, more preferably at least 10, but no more than 50 ITMs are disposed inside the vessel with an inter-membrane distance (i.e. pitch) of at least 10 mm, preferably at least 18 mm, more preferably 22 mm.

Figure 1D:
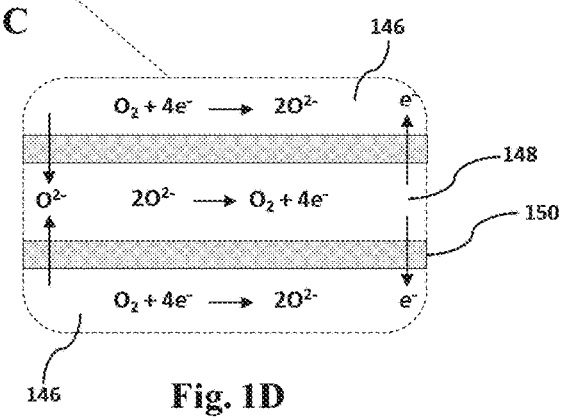
FIG. 1D illustrates a magnified image of an ion transport membrane in the ion transport membrane assembly.
Figure 1E:
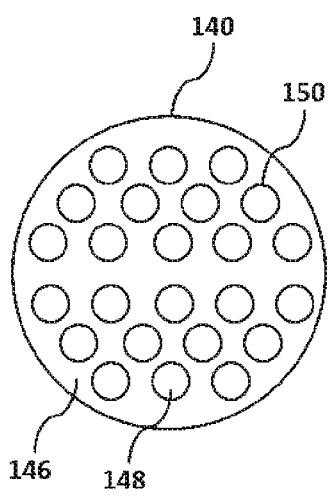
FIG. 1E illustrates a cross-section of the ion transport membrane assembly.
Figure 1F:
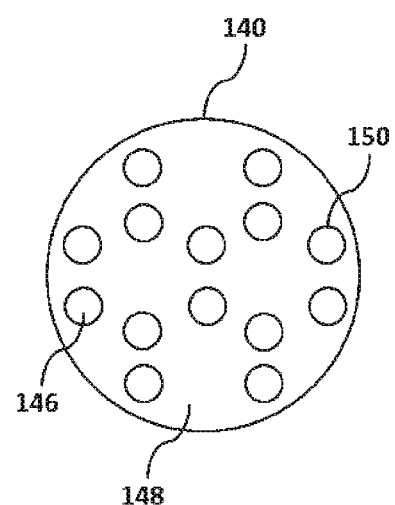
FIG. 1F illustrates a cross-section of the ion transport membrane assembly in an alternative embodiment.

The plurality of ion transport membranes 150 are oriented such that the internal cavity of the vessel is separated into a feed zone 146 (i.e. a space inside the vessel and outside of the plurality of ion transport membranes) and a plurality of permeate zones 148 (i.e. a space inside the plurality of ion transport membranes) (as shown in FIG. 1E). Alternatively, in another embodiment, the internal cavity of the vessel is separated into a plurality of feed zones 146 (i.e. a space inside the plurality of ion transport membranes) and a permeate zone 148 (i.e. a space inside the vessel and outside of the plurality of ion transport membranes) (as shown in FIG. 1F). The ITM assembly may alternatively be referred to as "a shell and tube assembly".

Figure 6:
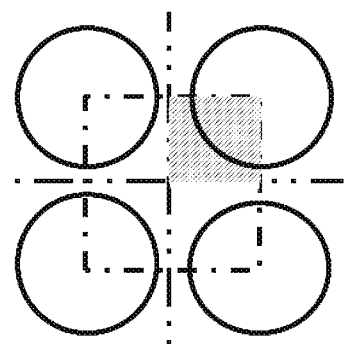
FIG. 6 illustrates a square arrangement of the ion transport membranes in the ion transport membrane assembly.

The plurality of ion transport membranes 150 may be disposed in various arrangements relative to each other. For example, in one embodiment, the ITMs are disposed such that a cross-section of the ITM assembly has an arrangement as depicted in FIG. 1E, or FIG. 1F. In another embodiment, the ITMs are equally spaced apart from each other having a square arrangement as depicted in FIG. 6, or a triangular arrangement. Furthermore, the ITMs are equally spaced apart from each other having a randomly arranged configuration.

Preferably, each of the plurality of ion transport membranes 150 is an elongated tube having a diameter in the range of 5 to 50 mm, preferably 10 to 30 mm, more preferably 15 to 20 mm. Furthermore, the elongated tube preferably has a length in the range of 0.5 to 5 m, more preferably 1 to 4 m, even more preferably 1.5 to 2 m. A wall thickness of the elongated tube may be in the range of 0.5 to 3.5 mm, preferably 0.5 to 2 mm, more preferably 1 to 1.5 mm. Additionally, a surface area of each ITM 150 may be in the range of 0.05 $m^2$-5 $m^2$, preferably 0.1-4 $m^2$, more preferably 0.5-3 $m^2$, even more preferably 1-3 $m^2$. Accordingly, an oxygen flux of each ion transport membrane is within the range of 0.01-0.1 $mol \cdot m^{-2} \cdot s^{-1}$, preferably 0.01-0.05 $mol \cdot m^{-2} \cdot s^{-1}$, more preferably about 0.03 $mol \cdot m^{-2} \cdot s^{-1}$ at a temperature in the range of 800-1,500° C., preferably 800-1,200° C., more preferably 800-1,000° C.

In another embodiment, each of the plurality of ion transport membranes 150 may be in the form a duct with a rectangular cross-section having a cross-sectional area in the range of 0.5 to 15 $cm^2$, preferably 1 to 8 $cm^2$, more preferably 1 to 3 $cm^2$, wherein the length and the wall thickness of the duct is preferably substantially similar to that of the elongated tube.

In a preferred embodiment, each ITM 150 may have a compressive strength of at least 50 MPa, preferably at least 100 MPa, more preferably at least 200 MPa, and may be utilized to prevent a collapse due to an excessive pressure in the feed zone 146. Each ITM may preferably be secured inside the ITM assembly 102 with bolts and nuts, O-rings (e.g. ceramic or metal rings), and/or gaskets to prevent any leakage from the feed zone 146 to each of the permeate zones 148 and vice versa.

The ion transport membrane (ITM) 150, used in the ITM assembly, functions to separate oxygen from air or other oxygen-containing gaseous mixtures by transporting oxide ions (i.e. $O^{2-}$) through a membrane that is capable of conducting oxide ions and electrons at elevated temperatures. When an oxygen partial pressure differential is applied on opposite sides of such a membrane, oxygen molecules ionize on one surface of the membrane and emerge on an opposite side as oxide ions. Then, the oxide ions (i.e. $O^{2-}$) recombine into molecular oxygen (i.e. $O_2$) on the opposite side, leaving behind free electrons that transport back through the membrane to ionize another oxygen molecule (this concept is depicted in FIG. 1D).

Each ITM is a semi-permeable membrane that allows passage of oxide ions (i.e. $O^{2-}$) from the feed zone to the plurality of permeate zones. The term "semi-permeable membrane" refers to a membrane that allows molecules or ions (in this case oxide ions) with a certain Stokes radius to pass therethrough by diffusion. Stokes radius of a substance in a membrane refers to the radius of a hard sphere that diffuses at the same rate as that substance through the membrane. Diffusion refers to a passage of the oxide ions through the ITM, and diffusivity is a passage rate of the oxide ions, which is determined by an oxygen partial pressure differential on both sides of the ITM as well as a volume fraction (or a number) of oxide ion vacancies present in the ITM.

Accordingly, the feed zone 146 of the ITM assembly 102 refers to a space inside the vessel that is configured to hold an oxygen-containing gaseous mixture. Similarly, the permeate zone refers to a space inside the vessel wherein molecular oxygen is formed and accumulated. When an oxygen molecule present in the feed zone 146 is contacted with each ITM 150, the oxygen molecule may be reduced and an oxide ion (i.e. $O^{2-}$) may be formed. The oxide ions may transport through each ITM 150 and may be combined with another oxide ion to form molecular oxygen (i.e. $O_2$) in the permeate zone.

Each ITM 150 may have a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, Ti, Nb, Mn, and Ga. Further, each of x, x', y, and y' in the general formula of each ITM has a value between 0 and 1, such that x+x'=1 and y+y'=1. Also, z is a number that varies to maintain electro-neutrality of the ITM. For example, in some embodiments, each ITM is a perovskite-type ceramic having a composition of $Ba_uBi_wCo_xFe_yO_{3-\delta}$, $Ba_uCo_wFe_xNb_yO_{3-\delta}$, $Ba_uFe_xNb_yO_{3-\delta}$, $Ba_wCe_xFe_yO_{3-\delta}$, $Ba_uSr_wCo_xFe_yO_{3-\delta}$, $Ba_uTi_wCo_xFe_yO_{3-\delta}$, $Ca_uLa_wFe_xCo_yO_{3-\delta}$, $Sr_uCa_wMn_xFe_yO_{3-\delta}$, $Sr_uCo_wFe_yO_{3-\delta}$, $La_2NiO_{4+\delta}$, $La_wCa_xFe_yO_{3-\delta}$, $La_wCa_xCo_yO_{3-\delta}$, $La_uCa_wFe_xCo_yO_{3-\delta}$, $La_wSr_xCo_yO_{3-\delta}$, $La_uSr_wTi_xFe_yO_{3-\delta}$, $La_uSr_wCo_xFe_yO_{3-\delta}$, $La_uSr_wGa_xFe_yO_{3-\delta}$, or $12.8La_vSr_wGa_xFe_yO_{3-\delta}$—Ba—$Sr_vFe_wCo_xFe_yO_{3-\delta}$, wherein u, v, w, x, and y are each in the range of 0-1, and δ varies to maintain electro-neutrality. In another embodiment, each ITM is a perovskite-type ceramic having a composition of $La_{1-x}Sr_xCoO_{3-\delta}$ with x in the range of 0.1-0.7. In some embodiments, each ITM is doped with a metallic element selected from the group consisting of Ni, Co, Ti, Zr, and La. Likewise, each ITM may be doped with a metallic element selected from the lanthanide group of the periodic table (i.e. metallic chemical elements with atomic numbers 57 through 71). Furthermore, each ITM may include a coating layer having a composition of $RBaCO_2O_{5+\delta}$, wherein R is a metallic element selected from the lanthanide group (i.e. elements with atomic numbers 57 through 71) of the periodic table. Preferably, R is at least one element selected from the group consisting of Pr, Nd, Sm, and Gd. In a preferred embodiment, each ITM includes pores in the size range of 0.1-10 nm, preferably 0.5-5 nm, more preferably 0.5-3 nm.

In one embodiment, a selectivity of each ITM 150 with respect to oxide ions (i.e. $O^{2-}$) is at least 90%, preferably at least 95%, more preferably at least 98%. Selectivity of an ITM with respect to an ion (e.g. oxide ions) is a measure of the capability of that ITM to transport the ion (e.g. oxide ions) over other substances present in an oxygen-containing gaseous mixture. For example, if selectivity of an ITM with respect to oxide ions is 99%, then 99 wt % of permeated substances through the membrane are oxide ions. Selectivity of an ITM with respect to oxide ions may be determined by the size of vacancies present in the crystal structure of each ITM. Oxide ions form in a reduction reaction when molecular oxygen is contacted with an ITM in the feed zone 146 and in the presence of free electrons. An ITM having a 100% selectivity with respect to oxide ions only allows the oxide ions to permeate through the membrane. In one embodiment, a selectivity of each ITM with respect to carbon dioxide, elemental nitrogen (i.e. $N_2$), water vapor, carbon monoxide, argon, and sulfur is less than 5%, preferably less than 2%, more preferably less than 1%, even more preferably less than 0.5%.

The ion transport membrane assembly 102 further includes a feed inlet 142 and a feed outlet 144 disposed on the feed zone 146. The feed inlet 142 and the feed outlet 144 are utilized as passages for loading and unloading the feed zone 146.

In one embodiment, the feed inlet 142 and the feed outlet 144 are substantially similar, wherein each is a cylindrical port having an internal diameter in the range of 10-80 mm, preferably 10-50 mm, more preferably 20-50 mm, and is configured to transfer a pressurized stream having a pressure in the range of 1-50 bars, preferably 1-30 bars, more preferably 1-20 bars.

The feed inlet 142 and the feed outlet 144 may be secured perpendicular and/or parallel to the longitudinal axis of the vessel. For example, in one embodiment, the vessel 140 is a horizontally oriented cylindrical vessel, where the longitudinal axis of each of the plurality of ITMs is substantially parallel to the longitudinal axis of the vessel, and the feed inlet 142 and the feed outlet 144 are secured parallel to the longitudinal axis of the vessel (as depicted in FIG. 1C). Alternatively, the feed inlet 142 and the feed outlet 144 may be disposed perpendicular to the longitudinal axis of the vessel (as depicted in FIGS. 1A and 1B).

The ion transport membrane assembly 102 further includes a sweep inlet 152 and a sweep outlet 154 disposed on each permeate zone 148. Similarly to the feed inlet 142 and the feed outlet 144, the sweep inlet and outlet of each permeate zone are adapted for loading and unloading each permeate zone. In one embodiment, each of the sweep inlets 152 and the sweep outlets 154 are substantially similar, wherein each is a cylindrical port having an internal diameter in the range of 2-20 mm, preferably 5-10 mm, relative to the diameter of each ITM 150, which is in the range of 5 to 50 mm, preferably 10 to 30 mm, more preferably 15 to 20 mm. Preferably, the each of the sweep inlets and the sweep outlets are configured to bear a pressure of up to 50 bars, preferably up to 100.

In one embodiment, the vessel 140 is cylindrical with a first and a second end separated by a side wall along a longitudinal axis of the vessel, and the feed inlet 142, the feed outlet 144, the sweep inlet 152, and the sweep outlet 154 of the plurality of permeate zones 148 are located on the first end of the vessel. Accordingly, each ITM has a U-shape structure, wherein the inlets and the outlets are located on a same end of the vessel. Having the feed inlet, the feed outlet, and the plurality of sweep inlets and the sweep outlets on one end of the vessel may provide an extended contact time of each gaseous mixture in the feed and the permeate zones with the ITMs. Furthermore, having all inlets and outlets on one end may provide a higher contact surface, when compared to an embodiment where inlets and outlets are located on opposite ends. In another embodiment, the feed inlet and the feed outlet are located on the first end of the vessel, and the sweep inlet and the sweep outlet of the plurality of permeate zones are located on the second end of the vessel. In another embodiment, the feed inlet and the sweep outlet of the plurality of permeate zones are located on the first end, and the feed outlet and the sweep inlet of the plurality of permeate zones are located on the second end of the vessel (as depicted in FIGS. 1A and 1B). Accordingly, the flow in the feed zone 146 is configured to be counter-current relative to the flow in each of the permeate zones. In an alternative embodiment, the feed inlet and the sweep inlet of the plurality of permeate zones are located on the first end, and the feed outlet and the sweep outlet of the plurality of permeate zones are located on the second end of the vessel. According to this embodiment, the flow in the feed zone is configured to be co-current relative to the flow in each of the permeate zones. Other than inlets/outlets designed to allow ingress and egress, the vessel may be sealed to prevent any leakage.

In a preferred embodiment, the combustion system 100 further includes a gas mixer 118 located downstream of and fluidly connected to the plurality of the sweep outlets 154 of the ITM assembly 102. The gas mixer 118 may be configured to combine a plurality of streams that egress the plurality of the sweep outlets into a single stream. Furthermore, in another preferred embodiment, the combustion system 100 further includes a gas splitter 116 located upstream of and fluidly connected to the plurality of the sweep inlets 152 of the ITM assembly 102. The gas splitter 116 may be configured to split a single stream into a plurality of streams and feed the same to the plurality of permeate zones 148 via the plurality of the sweep inlets 152.

The ion transport membrane assembly 102 further includes a plurality of baffles 156 disposed inside the vessel and secured to the side wall of the vessel (as depicted in FIG. 1C). In a preferred embodiment, the baffles 156 are equally spaced apart in a zigzag arrangement (as shown in FIG. 1C). Having the baffles with a zigzag arrangement may provide a larger residence time of the oxygen-containing stream inside the vessel, when compared to an embodiment where the baffles are not present. In another embodiment, the baffles 156 are randomly arranged within the vessel.

In addition, the ion transport membrane assembly may also include some other components such as, a gas feed assembly, one or more flow controllers, a manifold, and/or a gas connector.

The combustion system 100 further includes a combustion chamber 108. The combustion chamber 108 refers to a sealed vessel, wherein a fuel stream 122s is combusted in the presence of oxygen to form a gaseous mixture having an elevated pressure and temperature.

The combustion chamber 108 includes at least one inlet and at least one outlet. Preferably, the combustion chamber 108 includes an oxygen inlet 162, a fuel inlet 164, and at least one exhaust outlet 166. In a preferred embodiment, the oxygen inlet 162, the fuel inlet 164, and the at least one exhaust outlet 166 are substantially similar to the feed inlet 142 or the feed outlet 144 of the ITM assembly 102.

In one embodiment, the combustion chamber 108 is located downstream of and fluidly connected to the sweep outlet 154 of the plurality of permeate zones 148 via an oxygen line 120. Accordingly, the gas mixer 118 is adapted to combine the plurality of streams that egress the plurality of the sweep outlets 154 into a single stream and deliver the same to the oxygen inlet 162 via the oxygen line 120.

Referring to FIG. 1B. In another embodiment, the combustion chamber 108 has an inlet and an outlet, wherein the plurality of streams that egress the plurality of the sweep outlets are mixed with a fuel stream 122s in a mixer 107 to form a combustion mixture 123s, and the combustion mixture is then fed to the combustion chamber 108 via the inlet. The mixer 107 is preferably located upstream of the combustion chamber 108 and is fluidly connected to the inlet. The mixer 107 may refer to an operational unit adapted to mix a plurality of gas streams, preferably at medium-to-high pressures (i.e. at least 20 bars, preferably at least 50 bars), and deliver a mixed stream having a pressure within the range of 5-50 bars, preferably 10-30 bars, more preferably 10-20 bars, to the inlet of the combustion chamber 108. According to this embodiment, the mixer is configured to mix molecular oxygen or an oxygen-enriched stream 120s with the fuel stream 122s.

In a preferred embodiment, the combustion chamber 108 further includes one or more swirlers located inside of the combustion chamber and mechanically connected to the inlet or a plurality of inlets (i.e. oxygen inlet 162 and fuel inlet 164). The swirler is configured to expand and agitate influents of the combustion chamber, and to create a vortex of a fluid therein. Having a swirler (or a plurality of swirlers) at the inlet (or a plurality of inlets) of the combustion chamber may enhance mixing the influents. Further, having the swirler/s may increase a residence time of the influents inside the combustion chamber.

The oxygen line 120 may be a tubular channel that is configured to deliver an oxygen-enriched stream 120s from the plurality of permeate zones 148 to the inlet (or preferably the oxygen inlet 162) of the combustion chamber 108. Preferably, the oxygen line 120 may be made of a metal, a metal alloy, or a ceramic composite. Alternatively, the oxygen line may be made of a metal or a metal alloy coated with a high-temperature duty ceramic (e.g. alumina), and is configured to bear a pressure up to 50 bars, preferably up to 100 bars, even more preferably up to 150 bars, while also configured to endure a temperature up to 1,000° C., preferably 1,500° C., more preferably 2,000° C.

The combustion system 100 further includes a recycle line 126 that fluidly connects said exhaust outlet 166 of the combustion chamber 108 to the sweep inlet 152 of the plurality of permeate zones 148. The recycle line is configured to transport an exhaust stream that egresses the combustion chamber to the plurality of permeate zones of the ITM assembly. A diameter of the recycle line may vary depending on the volumetric flow rate of the exhaust stream. Preferably, the recycle line may have a diameter within the range of 1 to 20 cm, preferably 1 to 10 cm. Furthermore, a thickness of the recycle line may vary depending on the pressure and the temperature of the exhaust stream. For example, in one embodiment, the temperature of the exhaust stream is in the range of 600 to 1,000° C., preferably 600 to 1,000° C., wherein the thickness of the recycle line is within the range of 2 to 50 mm, preferably 5 to 30 mm, more preferably 5 to 20 mm. Additionally, a material type of the recycle line may vary depending on the temperature and the pressure of the exhaust stream. For example, in one embodiment, the temperature of the exhaust stream is in the range of 600 to 1,000° C., preferably 600 to 1,000° C., and the pressure of the exhaust stream is within the range of 5-50 bars, preferably 10-40 bars, more preferably 20-40 bars. Accordingly, the recycle line 126 is made of a high-temperature duty metal or an alloy with an alumina liner that covers an interior of the recycle line. In another embodiment, the recycle line 126 is made of a high-temperature duty metal or an alloy, and is configured to bear a pressure up to 50 bars, preferably up to 100 bars, even more preferably up to 150 bars, while also configured to endure a temperature up to 1,500° C., preferably 2,000° C., more preferably 2,500° C.

Preferably, the gas splitter 116 is adapted on the recycle line 126 to split the exhaust stream 124s, which egresses the exhaust outlet, into a plurality of exhaust streams and deliver the same into the plurality of the sweep inlets.

Figure 1I:
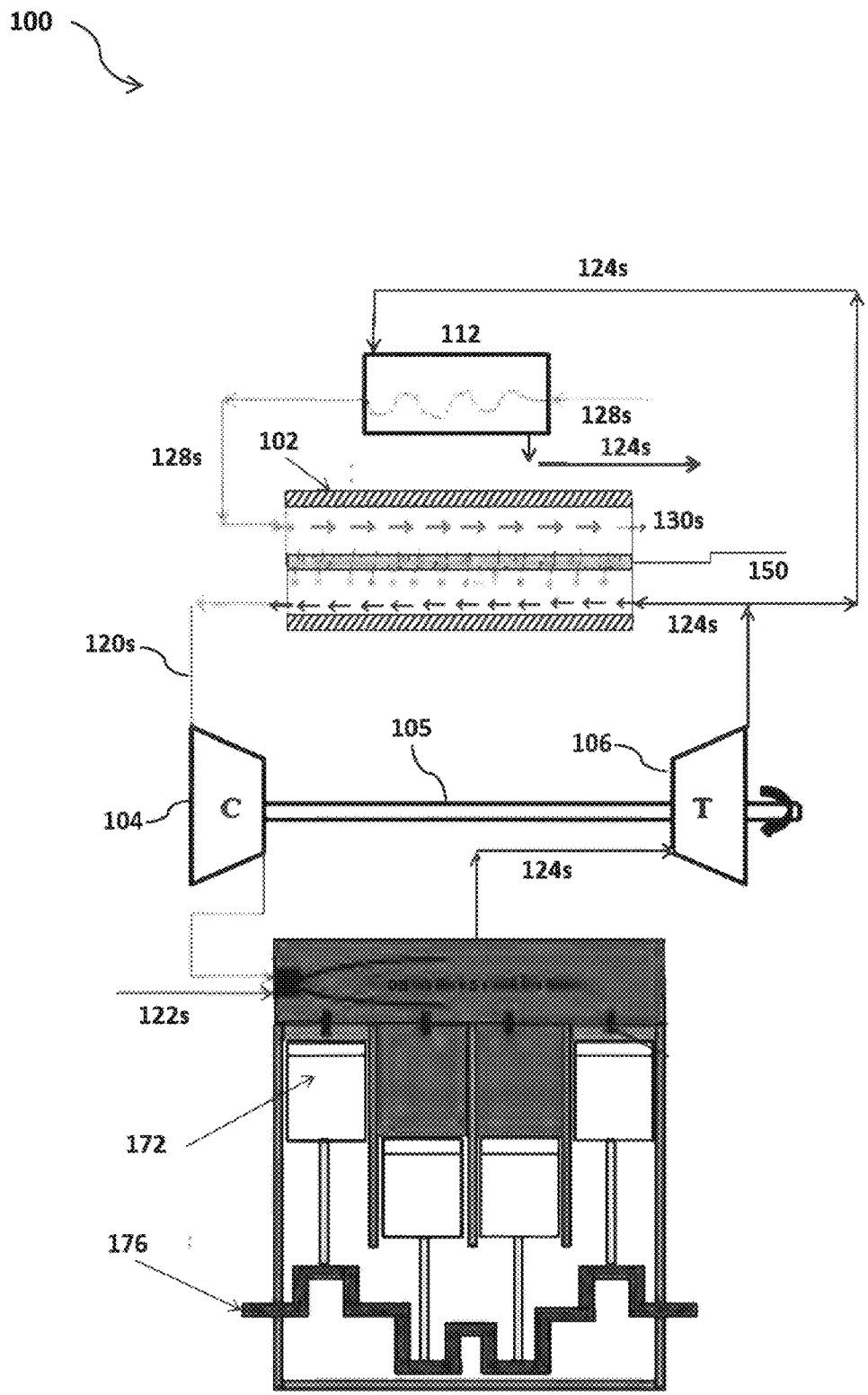
FIG. 1I is a process flow diagram of the combustion system having the internal combustion engine.

Referring now to FIGS. 1G and 1H. In a preferred embodiment, the combustion system 100 further includes a plurality of compartments 170 that are fluidly connected to the combustion chamber 108 via a plurality of apertures 168 and valves (as shown in FIGS. 1G and 1H). Furthermore, the combustion system according to this embodiment includes a plurality of pistons 172 that are slidably disposed inside the compartments 170. In addition, the combustion system of this embodiment includes a crack shaft 176 coupled to the plurality of pistons 172 via a plurality of levers 174. An assembly of the combustion chamber 108, and the plurality of compartments 170, apertures 168, valves, pistons 172, levers 174, and the crack shaft 176 may be referred to as an "internal combustion engine 110". FIG. 1I depicts a process flow diagram of a combustion system 100, wherein the internal combustion engine 110 is utilized to generate power. Accordingly, a portion of the exhaust stream 124s may be delivered to the compartments 170 via the plurality of apertures in a synchronized manner, which may be adjusted by a control system and the valves. The exhaust stream, which is in an elevated temperature and pressure, expands in the compartments 170, and pushes the pistons 172, and further drives the crank shaft 176 to produce a shaft work. The internal combustion engine 110 may preferably be a two-stroke engine, wherein the shaft work is generated with two strokes (up and down movements) of a piston during only one crankshaft revolution.

FIGS. 1A and 1B depicts a process flow diagram of a combustion system 100, wherein an expander 109 is disposed adjacent to the combustion chamber 108 and is utilized to generate power. In one embodiment, the combustion chamber 108 together with the expander 109 is also referred to as the internal combustion engine 110. According to this embodiment, the term "expander" may refer to a centrifugal or an axial flow turbine, wherein a pressurized stream (i.e. the exhaust stream) is expanded in an isentropic process (i.e. a constant entropy process) to produce shaft work when the pressurized stream passes through vanes of said turbine.

The shaft work, which is produced via the internal combustion engine 110, may also be utilized to drive a compressor, a generator (for generating electricity), a crankshaft of another engine, etc.

In one embodiment, the combustion system 100 further includes a turbocharger 103. The turbocharger 103, which may also be referred to as a "turbo", is a turbine-driven forced induction device that may increase an efficiency of the combustion system by forcing extra oxygen-enriched stream 120s (or extra combustion mixture) into the combustion chamber 108. Accordingly, the turbocharger 103 includes a compressor 104 fluidly connected to the oxygen line 120, and is located downstream of the sweep outlet 154 of the plurality of permeate zones 148 and upstream of the oxygen inlet 162 of the combustion chamber 108. The compressor 104 may compress the oxygen-enriched stream 120s and thus deliver extra oxygen-enriched stream to the combustion chamber 108, leading to generate more energy by oxy-combusting the oxygen-enriched stream.

The turbocharger further includes a turbine 106 fluidly connected to the at least one exhaust outlet 166 via an exhaust line 124, wherein the compressor 104 and the turbine 106 are coupled via a shaft 105. As a result, the exhaust stream 124s that egresses the combustion chamber 108 is utilized to drive the turbine 106 and may further run the compressor 104 via the shaft 105. Preferably, the exhaust line 124 is substantially similar to the recycle line 126 (as described previously).

In one embodiment, the combustion system 100 further includes a heat exchanger 112 located upstream of and fluidly connected to the feed inlet 142 of the ITM assembly 102 via a feed line 128 and downstream of and fluidly connected to the turbine 106 via the exhaust line 124. Accordingly, the heat exchanger 112 is configured to heat exchange an oxygen-containing stream 128s with the exhaust stream 124s.

The feed line 128 is a tubular channel that is configured to deliver an oxygen-containing stream 128s to the feed inlet 142 of the ITM assembly 102. Preferably, the feed line 128 may be made of a metal, a metal alloy, or a ceramic composite. Alternatively, the feed line 128 may be made of a metal or a metal alloy coated with a high-temperature duty ceramic (e.g. alumina), and is configured to bear a pressure up to 50 bars, preferably up to 100 bars, even more preferably up to 150 bars, while also configured to endure a temperature up to 500° C., preferably 1,000° C., more preferably 1,500° C.

In one embodiment, the combustion system 100 further includes a condenser 114 located downstream of and fluidly connected to the heat exchanger 112 via the exhaust line 124. Accordingly, the condenser 114 is configured to separate a liquid phase from the exhaust stream 124s to form a $CO_2$ stream 132s and a water stream 134s. Furthermore, the combustion system 100 may include a $CO_2$ line 132 that fluidly connects the condenser 114 to the sweep inlet 152 of the plurality of permeate zones 148. Preferably, the $CO_2$ line 132 is fluidly connected to the gas splitter 116, wherein the $CO_2$ stream 132s is split to a plurality of $CO_2$ streams, which is further delivered to the plurality of the sweep inlets.

Preferably, the $CO_2$ line 132 is substantially similar to the recycle line 126. The condenser may be a heat exchanger, a cooling system, or a refrigeration system, although the condenser type is not meant to be limiting and various other condensers may also be used. Preferably, the condenser 114 controls whether water vapor is delivered back to the ITM assembly or not. Accordingly, water vapor may be introduced to the ITM assembly when the exhaust stream is delivered to the ITM assembly without being condensed in the condenser 114. Therefore, it may be preferred to condense the exhaust stream to remove water content, and deliver the $CO_2$ stream 132s, which may be free from water vapor, instead of the exhaust stream.

In one embodiment, the combustion system 100 further includes an oxygen supplier located upstream of the ITM assembly 102 and fluidly connected to the feed inlet 142 via the feed line 128, and is configured to supply an oxygen-containing stream 128s to the feed zone 146 of the ITM assembly 102. The oxygen supplier may be an air cylinder or an oxygen cylinder. Preferably, it may be a compressor located upstream of and fluidly connected to the feed inlet 142 via the feed line 128, which delivers an air stream having a pressure in the range of 1-50 bars, preferably 5-40 bars, more preferably 10-30 bars. In addition, a heat exchanger and/or a heater may be adapted to raise a temperature of the air stream to be within the range of 800-1,200° C., preferably 800-1,000° C., before entering the feed zone.

In some alternative embodiments, the oxygen supplier may be a series of operational units that turns a gaseous mixture, preferably air, into an oxygen-containing stream 128s having an oxygen partial pressure of at least 200 torr, preferably at least 350 torr, more preferably 500 torr, even more preferably at least 600 torr. Furthermore, the oxygen supplier of this embodiment may also adjust the pressure, the temperature, the flow rate, the water content, etc. of the oxygen-containing stream prior to delivering the same to the feed inlet 142 of the ITM assembly 102. For example, in one embodiment, the oxygen supplier includes a stripping unit (or a series of separating units) that separates non-oxygen substances (e.g. nitrogen, carbon dioxide, and water vapor) present in the oxygen-containing stream. Or, in another embodiment, the oxygen supplier may further include a dehydrator and/or a dehumidifier, whereby a water content of the oxygen-containing stream is reduced to less than 1.0 vol %, preferably less than 0.5 vol %, more preferably less than 0.1 vol %, with volume percent being relative to the total volume of the oxygen-containing stream. A pressure of the oxygen-containing stream may also be adjusted via an auxiliary compressor in the oxygen supplier to be in the range of 1-50 bars, preferably 5-40 bars, more preferably 10-30 bars, wherein a temperature of the oxygen-containing stream may be adjusted (e.g. by a heater and/or a heat exchanger) to be within the range of 800-1,200° C., preferably 800-1,000° C.

In one embodiment, the combustion system 100 further includes a fuel supplier located upstream of the combustion chamber 108 and fluidly connected to the fuel inlet 164 via a fuel line 122, and is configured to supply a fuel stream 122s to the combustion chamber 108. Alternatively, the fuel supplier may supply the fuel stream 122s to the mixer 107, wherein the fuel stream 122s is mixed with the oxygen-enriched stream 120s, and the mixed stream is delivered to the combustion chamber 108. The fuel supplier may be a chemical plant and the fuel stream 122s may be a hydrocarbon stream outflowing said plant. For example, the fuel supplier may be a gasification plant that provides a syngas stream as the fuel stream. Alternatively, the fuel supplier may be a methane reforming plant (e.g. a solar methane reforming plant) that provides a syngas stream.

In some alternative embodiments, the fuel supplier may also refer to a series of operational units that provides a fuel stream 122s having a predetermined pressure, a predetermined temperature, a predetermined flow rate, and a predetermined water content. For example, the fuel supplier may include a dehydrator and/or a dehumidifier, whereby a water content of the fuel stream is reduced to less than 1.0 vol %, preferably less than 0.5 vol %, more preferably less than 0.1 vol %, with volume percent being relative to the total volume of the fuel stream. In addition, the fuel supplier may include a sulfur separator to reduce a sulfur content of the fuel stream to less than 500 ppm, preferably less than 100 ppm, more preferably less than 50 ppm. Preferably, the fuel supplier may also include a stripping unit (or a series of separating units) that separates non-oxygen substances such as carbon dioxide, water vapor, and preferably nitrogen from the fuel stream. A pressure of the fuel stream may be adjusted via an auxiliary compressor in the fuel supplier to be in the range of 1-50 bars, preferably 5-40 bars, more preferably 10-30 bars. In addition, a temperature of the fuel stream 104s may be adjusted (e.g. by a heater and/or a heat exchanger) to be within the range of 500-1,000° C., preferably 800-1,000° C.

Preferably, the fuel line 122 is substantially similar to the oxygen line 120. In one embodiment, the combustion system 100 further includes one or more flow control units to control a volumetric flow rate of an oxygen-enriched stream (that flows inside the oxygen line) based on a volumetric flow rate of a fuel stream (that flows inside the fuel line). In view of that, the flow control unit may include a flowmeter disposed on the oxygen line that is configured to determine the volumetric flow rate of the oxygen-enriched stream to generate a flow rate signal. Additionally, the flow control unit may include a control valve disposed on the fuel line, which is configured to control the volumetric flow rate of the fuel stream. The control valve may be a check valve, a ball valve, a gate valve, or a diaphragm valves, although the valve type is not meant to be limiting and various other type of valves may also be used. Furthermore, the flow control unit may include a flow controller that is configured to receive the flow rate signal from the flowmeter, and to generate and transmit an output signal to the control valve. The flow controller may refer to a programmable hardware device that is adapted to adjust the volumetric flow rate of the fuel stream based on the volumetric flow rate of the oxygen-enriched stream.

In one embodiment, the combustion system 100 further includes an expander 115 located downstream of and fluidly connected to the feed outlet 144 of the ITM assembly 102 via an oxygen-depleted line 130, and is configured to expand an oxygen-depleted stream 130s, which egresses the feed zone 146, to generate power. In one embodiment, the term "expander" may refer to a centrifugal or an axial flow turbine, wherein a pressurized stream (e.g. the oxygen-depleted stream) is expanded in an isentropic process (i.e. a constant entropy process) to produce shaft work when the pressurized stream passes through vanes of said turbine. The shaft work may further be utilized to drive a compressor, a generator (for generating electricity), a crankshaft of an engine, etc.

According to a second aspect the present disclosure relates to a method of combusting a fuel stream 122s, involving delivering an oxygen-containing stream 128s to the feed zone 146 of the ITM assembly.

The oxygen-containing stream 128s refers to a gaseous stream that includes oxygen, and may further include nitrogen and less than 1.0 vol %, preferably less than 0.5 vol % of argon, carbon dioxide, neon, helium, hydrogen, and water vapor. Preferably, an oxygen partial pressure of the oxygen-containing stream 128s may be at least 200 torr, preferably at least 350 torr, more preferably 500 torr, even more preferably at least 600 torr. Preferably, the method involves compressing the oxygen-containing stream to have a pressure within the range of 1-50 bars, preferably 5-40 bars, more preferably 10-30 bars. In addition, the method may further involve heating the oxygen-containing stream to have a temperature within the range of 800-1,200° C., preferably 800-1,000° C. A temperature of the oxygen-containing stream may be adjusted via one or more heat exchangers or heaters that are located across the feed line (e.g. heat exchangers 112 and 113, as shown in FIG. 1B). Furthermore, a pressure of the oxygen-containing stream may be adjusted via one or more compressors located across the feed line (e.g. compressor 117, as shown in FIG. 1B). Additionally, the method may involve reducing a water content of the oxygen-containing stream to have a water content of less than 1.0 vol %, preferably less than 0.5 vol %, more preferably less than 0.1 vol % via a condenser located across the feed line (not shown). The oxygen-containing stream may be delivered to the feed zone 146 of the ITM assembly via the feed line 128 and preferably a compressor 117 disposed on the feed line 128 (as depicted in FIG. 1B).

After the oxygen-containing stream 128s is delivered to the feed zone 146, molecular oxygen present in the oxygen-containing stream is transported across the plurality of ion transport membranes 150 to the plurality of permeate zones 148 of the ITM assembly. The molecular oxygen, which is accumulated in the plurality of permeate zones, may contain less than 1.0 vol %, preferably less than 0.5 vol %, more preferably less than 0.1 vol %, even more preferably less than 0.01 vol % of nitrogen, argon, carbon dioxide, neon, helium, hydrogen, and water vapor.

The method of combusting further involves delivering the molecular oxygen present in the plurality of permeate zones to a combustion chamber. In view of that, the molecular oxygen is delivered to the oxygen inlet 162 of the combustion chamber via an oxygen line 120, while preferably a gas pump, more preferably a compressor 104 is disposed on the oxygen line to facilitate delivering the molecular oxygen. The molecular oxygen may preferably be compressed before delivering to the combustion chamber.

In an alternative embodiment, the method involves delivering the molecular oxygen to the mixer 107 prior, wherein the molecular oxygen is mixed with the fuel stream 122s to form a combustion mixture 123s, and further delivering the combustion mixture to the inlet (i.e. the fuel inlet 164 or the oxygen inlet 162) of the combustion chamber 108.

The method of combusting further involves delivering the fuel stream 122s to the combustion chamber to combust the fuel stream with the molecular oxygen via an oxy-combustion process to form an exhaust stream.

In some embodiments, the fuel stream 122s refers to a hydrocarbon-containing stream. For example, the fuel stream may be a methane stream, an ethane stream, and/or a syngas stream (i.e. a gaseous stream of hydrogen and carbon monoxide). Besides, the fuel stream may further contain one or more combustible compounds (alkanes, alkenes, alkynes, cycloalkanes, etc.) having a carbon content in the range of $C_1$-$C_{20}$, preferably $C_1$-$C_{12}$, more preferably $C_1$-$C_8$. Preferably, the fuel stream contains less than 5.0 vol %, preferably less than 2.0 vol % of nitrogen and water vapor. Furthermore, the fuel stream includes less than 500 ppm, preferably less than ppm 100, more preferably less than 50 ppm of sulfur. Having a fuel stream with a reduced sulfur content may be advantageous towards preventing formation of sulfur oxides ($SO_x$) in the exhaust stream, while a fuel stream with a reduced nitrogen content may be advantageous towards preventing formation of nitrogen oxides ($NO_x$) in the exhaust stream. Further to the above, the fuel stream may include traces amount (preferably less than 0.1 vol %) of hydrogen sulfide, argon, helium, nitrogen oxides (i.e. nitric oxide, nitrous oxide, nitrogen dioxide), or sulfur dioxide. Preferably, the fuel stream 122s comprises at least 70 vol %, more preferably at least 80 vol %, most preferably at least 90 vol % of the combustible compounds (as described). A pressure of the fuel stream may be adjusted to be in the range of 1-50 bars, preferably 5-40 bars, more preferably 10-30 bars, whereas a temperature of the fuel stream may be adjusted to be within the range of 500-1,000° C., preferably 800-1,000° C. The fuel stream 122s may be in a liquid phase and/or in a gaseous phase before entering the combustion chamber.

In one embodiment, the fuel stream 122s is expanded and agitated via a swirler located at the fuel inlet 164 of the combustion chamber. The swirler may create a vortex of the fuel stream inside the combustion chamber.

The exhaust stream 124s includes carbon dioxide and water vapor, and may also include less than 1.0 vol %, preferably less than 0.5 vol % of carbon monoxide, nitrogen oxides (i.e. nitric oxide, nitrous oxide, nitrogen dioxide), sulfur dioxide, argon, helium, and/or carbonic acid. In one embodiment, the exhaust stream 124s has a temperature in the range of 500-2,000° C., preferably 1,000-2,000° C., more preferably 1,000-1,500° C., and a pressure in the range of 5-50 bars, preferably 10-40 bars, more preferably 20-40 bars.

The method of combusting further involves flowing a portion of the exhaust stream 124s, which may initially be formed by combusting the fuel stream 122s in the presence of molecular oxygen in the combustion chamber, into the plurality of permeate zones 148 of the ITM assembly to form an oxygen-enriched stream 120s, which includes the molecular oxygen, carbon dioxide, and water vapor. Flowing the exhaust stream 124s into the plurality of permeate zones 148 of the ITM assembly sweeps away the molecular oxygen, which has been accumulated in each permeate zone, and thus may effectively increase an oxygen flux of each ITM. An auxiliary compressor (not shown) located on the exhaust line and downstream of the turbine 106 may be utilized to flow the exhaust stream into the plurality of permeate zones of the ITM assembly. Other than the molecular oxygen, carbon dioxide, and water vapor, the oxygen-enriched stream 120s may also include less than 1.0 vol %, preferably less than 0.5 vol % of carbon monoxide, nitrogen, hydrogen, argon, helium, nitrogen oxides (i.e. nitric oxide, nitrous oxide, nitrogen dioxide), and/or sulfur dioxide. Preferably, an oxygen partial pressure of the oxygen-enriched stream 120s is at least 600 torr, preferably at least 700 torr, more preferably 800 torr, even more preferably at least 1,000 torr.

In a preferred embodiment, a gas (or oxygen) analyzer is adapted on the oxygen line 120 to measure an oxygen partial pressure of the oxygen-enriched stream 120s. Further to the gas analyzer, a bypass line (not shown) is also adapted that fluidly connects the oxygen line 120 to the recycle line 126. Moreover, a first valve is disposed on the bypass line and a second valve is disposed on the oxygen line. Additionally, a controller is utilized to receive a signal from the gas analyzer, and generate an output signal and transmit the output signal to the valve. Accordingly, in one embodiment, the controller is programmed to close the first valve (and the bypass line) and to open the second valve (and the oxygen line), when the oxygen partial pressure of the oxygen-enriched stream 120s is at least 600 torr, preferably at least 700 torr, more preferably 800 torr, even more preferably at least 1,000 torr. However, in another embodiment, the controller is also programmed to open the first valve (and the bypass line) and closes the second valve (and the oxygen line), when the oxygen partial pressure of the oxygen-enriched stream 120s is less than 600 torr, preferably less than 500 torr. In view of this embodiment, the oxygen-enriched stream 120s is recycled to the recycle line to via the bypass line and is further fed to the plurality of permeate zones of the ITM assembly until the oxygen partial pressure of the oxygen-enriched stream 120s is at least 600 torr, preferably at least 700 torr, more preferably 800 torr, even more preferably at least 1,000 torr. At this point, the controller closes the first valve (and the bypass line) and opens the second valve (and the oxygen line), and the oxygen-enriched stream 120s is delivered to the combustion chamber 108.

Having a plurality of ITM tubes in the vessel (i.e. the shell and tube structure, as described previously) may increase an effective membrane surface area, thus increasing a rate of oxygen permeation via the ITMs. Furthermore, the shell and tube structure of the ITM assembly may ease the process of flowing the exhaust stream to sweep away the molecular oxygen, and to ensure that combustion does not take place inside the ITM assembly.

In one embodiment, the exhaust stream 124s is flowed into the plurality of permeate zones 148 in a direction counter-current to the flow of the oxygen-containing stream 128s in the feed zone 146. In another embodiment, the exhaust stream 124s is flowed into the plurality of permeate zones 148 in a direction co-current to the flow of the oxygen-containing stream 128s in the feed zone 146. In another embodiment, the exhaust stream 124s is flowed into the plurality of permeate zones 148 such that the flow of the exhaust stream in the plurality of permeate zones 148 is co-current and counter-current to the flow of the oxygen-containing stream 128s in the feed zone 146 (i.e. the elongated tubes of the ITM assembly have a U-shape structure).

The exhaust stream 124s may also be utilized to heat up a process stream in the combustion system 100, or a process stream in a power plant, a chemical processing plant, or a refining plant. Additionally, the exhaust stream may be utilized to run pneumatic actuators and/or pneumatic systems in a power plant, a chemical processing plant, or a refining plant.

Referring now to FIG. 1B. Preferably, in an alternative embodiment, carbon dioxide and water vapor are present in the exhaust stream 124s, and the exhaust stream is first cooled via the condenser 114 (as described previously) to form a liquid phase in the exhaust stream.

The exhaust stream 124s may be cooled to room temperature (i.e. 25° C.), preferably a temperature below room temperature and above water freezing point (e.g. 15° C.), at atmospheric pressure to form the liquid phase, which may also contain traces amount of carbonic acid. Subsequently, the liquid phase may be separated from the exhaust stream, for example via the condenser 114 or a liquid-vapor separator, to form a $CO_2$ stream 132s and a water stream 134s. The $CO_2$ stream 132s preferably includes carbon dioxide and no more than 0.5 vol %, preferably no more than 0.1 vol % of nitrogen, hydrogen, carbon monoxide, argon, helium, methane, ethane, etc. Then, a portion of the $CO_2$ stream 132s is flowed into the plurality of permeate zones 148 to form the oxygen-enriched stream 120s including the molecular oxygen and carbon dioxide. Since the $CO_2$ stream 132s may contain traces amount of substances such as carbon monoxide, nitrogen, argon, helium, nitrogen oxides, sulfur dioxide, etc., the oxygen-enriched stream, which is formed according to this embodiment, may also include such substances. In one embodiment, the oxygen-enriched stream may also include less than 2.0 vol %, more preferably less than 1.0 vol % of water vapor.

In a preferred embodiment, the $CO_2$ stream 132s is nearly a pure carbon dioxide having at least 99 vol %, preferably at least 99.5 vol %, more preferably at least 99.9 vol % carbon dioxide, and thus the method further involves injecting the $CO_2$ stream 132s into a geological formation. The $CO_2$ stream may also be used in supercritical extraction systems or in processes where a low/medium/high pressure $CO_2$ stream is needed.

The method of combusting further involves delivering the oxygen-enriched stream 120s to the oxygen inlet 162 of the combustion chamber via the oxygen line 120.

In one embodiment, the method of combusting further involves adjusting the volumetric flow rate of the fuel stream 122s based on the volumetric flow rate of the oxygen-enriched stream via the flow control unit. In view of that, the volumetric flow rate of the fuel stream is adjusted (preferably via the flow control unit) to be within the range of 1-5,000 L/min, preferably 100-3,000 L/min, more preferably 500-2,000 L/min. In an alternative embodiment, the volumetric flow rate of the fuel stream is adjusted such that a volumetric flow rate ratio of the fuel stream to the oxygen-enriched stream to be in the range of 0.5-1.5, preferably about 1.

Alternatively, in one embodiment, the method of combusting further involves mixing the oxygen-enriched stream 120s with the fuel stream 122s via the mixer 107 to form a combustion mixture 123s, and delivering the combustion mixture to the inlet (e.g. the oxygen inlet 162 or the fuel inlet 164) of the combustion chamber. The combustion mixture 123s includes molecular oxygen and at least one hydrocarbon compound selected from the group consisting of alkanes, alkenes, alkynes, cycloalkanes having a carbon content in the range of $C_1$-$C_{20}$, preferably $C_1$-$C_{12}$, more preferably $C_1$-$C_8$. Furthermore, the combustion mixture 123s may include one or more of hydrogen, carbon monoxide, water vapor, and carbon dioxide, wherein a volume fraction of water vapor in the combustion mixture is less than 0.005, more preferably less than 0.001.

The method of combusting further involves expanding the exhaust stream 124s in an expander to generate power. As used herein, the term "expanding" refers to a process whereby a high pressure gaseous stream is delivered to an expander (e.g. an internal combustion engine, a turbine, etc.) to generate power. For example, in one embodiment, the expander is a turbine and the exhaust stream 124s is flowed through vanes of the turbine to drive the turbine and to generate shaft work.

In one embodiment, the exhaust stream 124s has a temperature in the range of 500-2,000° C., preferably 1,000-2,000° C., more preferably 1,000-1,500° C., prior to expanding in the expander, whereas the temperature drops to a value in the range of 100-1,000° C., preferably 500-800° C., after expanding. In addition, the exhaust stream may have a pressure in the range of 5-50 bars, preferably 10-40 bars, more preferably 20-40 bars, whereas the pressure may drop to a pressure of less than 10 bars, or preferably less than 5 bars, after expanding. As a result, a liquid phase may form, and the exhaust stream may turn into a double phase stream (i.e. containing both a gaseous phase and a liquid phase), having less than 1.0 vol %, preferably less than 0.5 vol % of the liquid phase.

In a preferred embodiment, the method of combusting further involves heat exchanging the oxygen-containing stream 128s with the exhaust stream 124s via the heat exchanger 112, prior to delivering the oxygen-containing stream to the feed zone 146 of the ITM assembly. As a result of heat exchanging the oxygen-containing stream with the exhaust stream, a temperature of the oxygen-containing stream may raise to a temperature in the range of 400-800° C., preferably 600-800° C., while concurrently a temperature of the exhaust stream may drop to a value in the range of 100-500° C., preferably 100-400° C.

In another embodiment, the method of combusting further involves heat exchanging the oxygen-containing stream 128s with the oxygen-depleted stream 130s via an auxiliary heat exchanger 113, prior to delivering the oxygen-containing stream to the feed inlet 142 of the ITM assembly. As a result of heat exchanging the oxygen-containing stream with the oxygen-depleted stream, a temperature of the oxygen-containing stream may raise to a temperature in the range of 500-1,000° C., preferably 800-1,000° C. Heat exchanging the oxygen-containing stream with the oxygen-depleted stream may eliminate the need for an additional process step to adjust the temperature of the oxygen-containing stream prior to delivering the same to the ITM assembly.

In one embodiment, the oxygen-depleted stream 130s, which egresses the feed outlet 144 of the ITM assembly, has a pressure in the range of 1 to 10 bars, preferably 5 to 10 bars, and a temperature in the range of 600-1,200° C., preferably 800-1,000° C., and the method of combusting further involves expanding the oxygen-depleted stream in an expander to generate power. The oxygen-depleted stream 130s may include oxygen, nitrogen and less than 1% by volume of argon, carbon dioxide, neon, helium, hydrogen, and water vapor. Alternatively, the oxygen-depleted stream 130s, which may be rich in nitrogen, may be utilized in fertilizer industries. The oxygen-depleted stream 130s may refer to a gaseous stream having an oxygen partial pressure within the range of 10 to 400 torr, preferably 50 to 400 torr. In situations where an oxygen partial pressure of the oxygen-depleted stream is within the range of 100 to 400 torr, preferably 200 to 400 torr, then a portion of the oxygen-depleted stream may be recycled to be mixed with the oxygen-containing stream 128s to be delivered to the feed zone 146 of the ITM assembly.

The examples below are intended to further illustrate protocols for the combustion system and the method of combusting a fuel stream, and are not intended to limit the scope of the claims.

EXAMPLE 1

In the following examples, a continuous combustion turbocharged high pressure high power ITM integrated zero emission internal combustion engine, as shown in FIG. 1I, is overviewed. A membrane unit is attached to the internal combustion engine cycle between the exhaust and the intake manifolds to separate the needed oxygen for combustion utilizing the heat of the exhaust gases.

The engine exhaust gases at high pressure and high temperature are passed through a turbine to generate the needed power to drive the compressor. Then, part of the exhaust gases are passed in the permeate side of the membrane unit to extract oxygen from the air flow in the feed zone of the membrane and the other part is passed through a condenser to separate $CO_2$. The oxygen rich gas mixture leaving the permeate side is compressed to the combustion chamber of the continuous combustion internal combustion engine. Oxy-combustion process occurs inside the ITM assembly and the exhaust gases are only $CO_2$ and $H_2O$. $H_2O$ can be removed through a simple condensation process and then $CO_2$ can be captured and compressed.

To increase the power and efficiency of the internal combustion engine, a continuous combustion ITM assembly is introduced to be integrated with the piston-cylinder assembly of an ICE. In this case, a common high pressure combustion chamber will be used and a series of inlet valves will control the timing of the flow to each cylinder. A high pressure compressor driven through exhaust heat recovery turbine will be used to compress the oxidizer mixture leaving the ITM unit to the combustion chamber. The cycle of the ICE will be reduced to two strokes, namely power and exhaust strokes. The high pressure continuous oxy-combustion system should result in stable high power high speed high efficiency ICE.

EXAMPLE 2

This example overviews a method of operating the high pressure continuous oxy-combustion system. Accordingly, air enters the upper channel in the ITM unit (as shown in FIG. 1I) where oxygen is permeated through the membrane from the feed zone to the permeate side. Part of the exhaust flue gases leaving the turbine is used to heat up the incoming fresh air in a condenser before introducing it to the ITM unit. The condenser is used to separate $H_2O$ for $CO_2$ capture. Oxygen depleted air ($N_2$-enriched air) leaves the channel and can be used for other purposes such as fertilizer industry, etc. Oxygen is separated inside the ITM unit using hot engine exhaust gases as sweep gases and then a mixture of $CO_2$, $H_2O$ and $O_2$ is introduced to the high pressure continuous ITM assembly after compression inside a high pressure compressor. The purpose of the sweep gas is to purge the oxygen in order to reduce the partial pressure of $O_2$ and, thus increase the oxygen flux through the membrane. The necessary heat to activate the membrane for oxygen separation can be extracted from the exhaust flue gases leaving the turbine as presented in FIG. 1I. The hot gases are then introduced to the ITM unit in the permeate side. Membrane is heated by the heat from the hot exhaust gases and then it is activated for oxygen transport.

Preferably, the temperature of the engine exhaust gases is within the operating range of the membrane and enough for activating the membrane for oxygen separation. Therefore, failure of the membrane due to excess temperature is not expected at all because there is no combustion occurring in the permeate side of the membrane.

The counter-current flow configuration used in the ITM unit has many inherent advantages over co-current ones. Examination of the partial pressure profile reveals that the partial pressure difference is almost constant along the reactor length, and the oxygen permeation flux is higher as compared to the case of co-current flow configuration (higher recovery ratio). Furthermore, in the counter current flow configuration, the more sensitive region where the permeate partial pressure is low coincides with the region where the feed partial pressure is low, which appears to be a better match-up than the co-current case, where the high feed matches up with the low permeate.

The presence of a combustion chamber provides a continuous combustion, and therefore the exhaust flow is steady and no need for the use of accumulators to make the flow steady and prevent pulsation of the flow in case of conventional ICEs.

EXAMPLE 3

The continuous combustion feature of the present invention results in steady flow to the turbine and, as a result, stable turbine operation is obtained while generating high output power. The turbine is connected with a compressor and the input power to the compressor will be increased when the turbine output power is increased. A turbine compressor system is used (turbocharged system), the compressor is driven using an exhaust gases heat recovery turbine located between engine exhaust and the ITM unit. The high pressure exhaust gases leaving the continuous ITM assembly are passed through a turbine to generate the power to drive a high pressure compressor. As a result, the exhaust gases leave the turbine at low pressure and moderate temperature that suit the operation of the ITM unit. The oxidizer mixture containing leaving the ITM is compressed through the compressor to the high pressure continuous ITM assembly.

EXAMPLE 4

The oxy-combustion process occurs inside the continuous combustion high pressure ITM assembly of the internal combustion engine. Part of the exhaust gases is recirculated through the ITM unit and the remaining exhaust flow is passed through a condenser to heat up the incoming fresh air and separate $CO_2$ for complete elimination of engine emissions.

This process of combustion results in combustion products consist mainly of $H_2O$ and $CO_2$. $H_2O$ is separated inside the condenser and $CO_2$ is captured for sequestration. Based on that, the present invention results in a carbon-free ICE. Also, as $N_2$ is completely excluded from the combustion process and $NO_x$ emissions are inhibited. Based on that, the present invention results in complete elimination of engine emissions.

EXAMPLE 5

Figure 2:
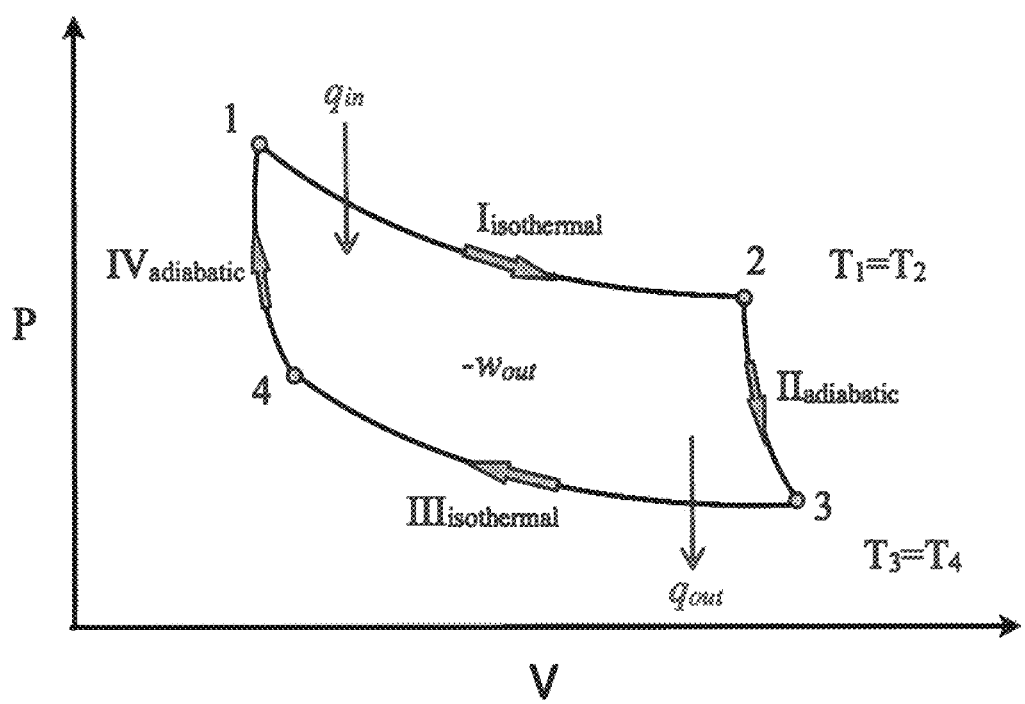
FIG. 2 represents a P-V diagram of a Carnot cycle.

FIG. 2 presents the Carnot heat engine cycle on the P-V diagram. The cycle assumes no irreversibility within the system and, based on that, Carnot cycle has maximum efficiency when it is compared with a real engine working between the same heat source and heat sink. The cycle combines four processes including isothermal heat addition, adiabatic expansion, isothermal heat rejection and adiabatic compression. The present high pressure continuous combustion ITM integrated internal combustion engine utilizes almost constant pressure power and exhaust strokes in addition to adiabatic expansion and compression processes through the turbocharger turbine and compressor, respectively. Based on that, the performance and output power based on the cycle of the present invention will be very similar to those of Carnot cycle. The pressure and temperature inside the ITM assembly remain constant at certain flow rates of fuel and oxidizer. During the power stroke, the intake valve is opened and the power is generated at almost constant pressure through the whole power stroke from the top center to the bottom center. During the exhaust stroke, the gases are also removed under almost constant pressure conditions. As a result, more power is generated at high crank shaft revolutions and the system is operated very close to the Carnot cycle and, accordingly, maximum power is generated by the engine. This is unlike the case of conventional ICEs where the pressure during the power stroke is reduced to values close to the atmospheric pressure at the end of the expansion stroke which results in reduction in the engine output power. Based on that, the present high pressure continuous combustion ITM integrated ICE has high efficiency as compared to the conventional ICEs working on Otto or Diesel cycles which have efficiencies much less than the Carnot one.

EXAMPLE 6

Figure 3:
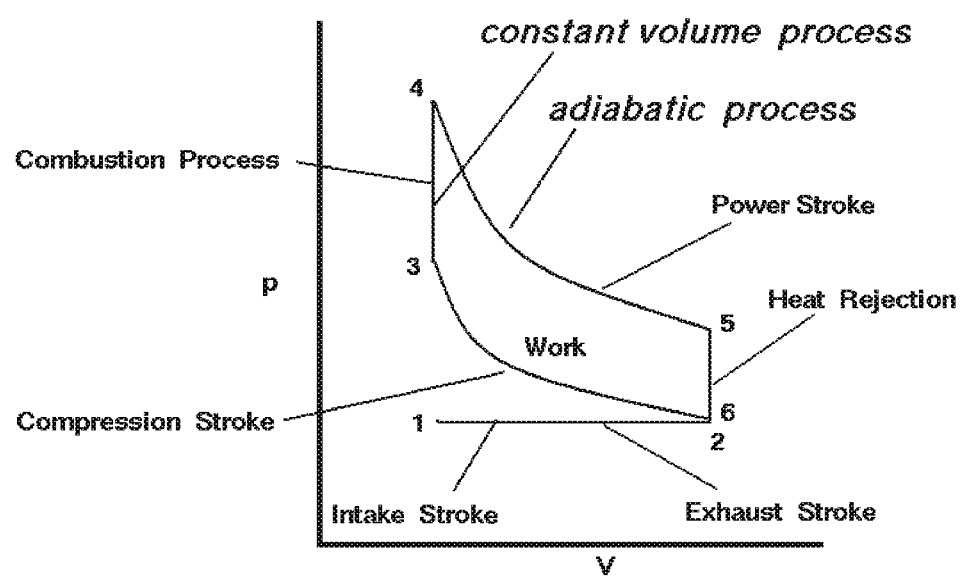
FIG. 3 represents a P-V diagram of an Otto cycle.
Figure 4:
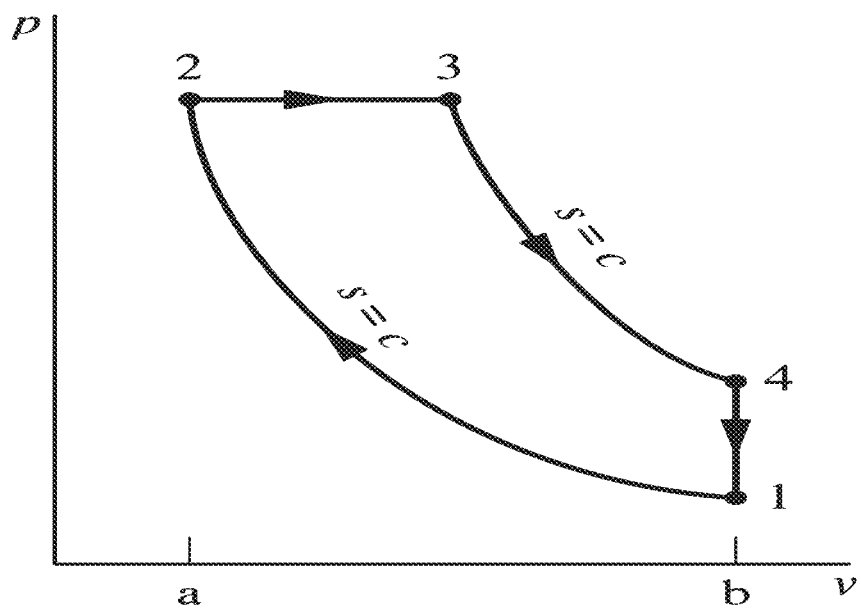
FIG. 4 represents a P-V diagram of a Diesel cycle.

In conventional ICEs, Otto (in case of gasoline engine) or diesel (in case of diesel engine) cycles are used. Representations of both cycles are shown in FIG. 3 and FIG. 4. In an ideal condition, the maximum efficiency of Otto cycle is expressed as follows:

$$\eta = 1 - \frac{1}{r^{\gamma-1}}$$

where r is the compression ratio and $\gamma$ is the specific heat ratio (1.4 for air). The range of compression ratio in gasoline engine is from 8 to 12. Based on that, the efficiency of a conventional gasoline ICE should be in the range from 56% to 63%.

Also, in an ideal condition, the maximum efficiency of Diesel cycle is expressed as follows:

$$\eta = 1 - \frac{1}{r^{\gamma-1}}\left(\frac{\alpha^{\gamma}-1}{\gamma(\alpha-1)}\right)$$

where r is the compression ratio, $\gamma$ is the specific heat ratio (1.4 for air) and $\alpha$ is the cut off ratio ($V_3/V_2$). The range of compression ratio in diesel engine is from 14 to 22. Based on that, the efficiency of a conventional diesel ICE should be in the range from 59% to 66%. In addition, in an ideal condition, the efficiency of Carnot cycle is expressed as follows:

$$\eta = 1 - \frac{T_L}{T_H}$$

where $T_L$ is the low temperature (ambient temperature) and $T_H$ is the high temperature (combustion temperature). Based on the operating conditions inside ICEs, the Carnot efficiency can approach higher values as compared to conventional gasoline and diesel engines. For example, if an automobile engine burns gasoline at a temperature of $T_H=816°$ C.=1089 K and the ambient temperature is $T_L=21=294$ K, then its maximum possible efficiency is about 73%. If we keep in mind that the engine in the present invention is working on a cycle very similar to Carnot cycle, then, the efficiency of the present novel engine will be much higher than the efficiency of conventional ICEs. Also, the engine in the present invention is high pressure continuous combustion ICE; then, the combustion (high temperature) is expected to be very high as compared to conventional ICEs and, as a result, the efficiency of the present novel engine is expected to approach 80% when it is compared to 63% and 66% for gasoline and diesel engines, respectively.

The above calculations are based on reversible cycles. Considering irreversibility losses and mechanical and heat transfer losses which reduce the efficiency in any of the previous cycles to around 55% (relative efficiency) of their values, the comparison of the actual engine efficiency can be presented as shown in Table 1, based on the compression and cut off ratio given above.

TABLE 1

Comparison of the presently disclosed engine efficiency with conventional Otto and Diesel engines.

| Parameter | | Otto (spark ignition engine) | Diesel (Compression ignition engine) | An engine utilizing the disclosed cycle |
|---|---|---|---|---|
| Cycle efficiency | thermal | 56-63% | 59-66% | 73-80% |
| Actual efficiency | engine | 30-34% | 32-36% | 40-44% |

EXAMPLE 7

It is well known that transportation consumes 28% of the total energy consumption. Thus, utilization of the cycle disclosed herein would save 25% of the energy consumption by transportation (7.0% of the total raw energy). Furthermore, it is well known that more than one-quarter of total greenhouse gas emissions comes from the transportation sector. Thus utilization of the currently disclosed cycle would reduce the carbon dioxide production by 25% of the $CO_2$ production by transportation sector (6.25% of the total $CO_2$ production). For example Saudi Arabia produces around 500 million ton of $CO_2$ per year. Utilizing the cycle disclosed herein would reduce this quantity to 400 million ton per year.

EXAMPLE 8

In the following examples, a continuous combustion turbocharged high-pressure high-power ITM-integrated zero-emission internal combustion engine is designed based on certain structural parameters and operating conditions. The system utilizes an ion transport membrane (ITM) unit, a high pressure common continuous ITM assembly, an internal combustion engine (ICE), a compressor-turbine (turbocharger) system and a condenser for $CO_2$ separation before being captured. The high pressure exhaust gases leaving the continuous ITM assembly are passed through a turbine to generate the power to drive a high pressure compressor. Oxygen is separated from air inside the ITM unit utilizing part of the hot exhaust gases leaving the turbine as sweep gases and, then, a mixture of $CO_2$, $H_2O$ and $O_2$ are generated at the outlet of the ITM unit. This mixture is introduced to the high pressure continuous ITM assembly after compression inside a high pressure compressor. Fuel along with the oxidizer mixture is fed to a common continuous ITM assembly. The oxy-combustion process occurs inside the continuous ITM assembly in the absence of $N_2$. As a result, the combustion products are free of NOx emissions and consist mainly of $H_2O$ and $CO_2$. The other part of exhaust gases leaving the turbine is passed through a condenser to heat up the incoming fresh air and separate $CO_2$ for complete elimination of engine emissions. A single continuous combustion high pressure common ITM assembly is used in the present system instead of the conventional multi-combustion chambers that are used in conventional ICEs. The number of strokes of the engine is reduced to two stokes including high constant pressure power stroke in addition to the exhaust stroke. The system results in high pressure stable oxy-combustion flame in a common continuous fuel flexible ITM assembly.

EXAMPLE 9

In this section a numerical study is conducted to prove the validity of integrating ITM unit with the disclosed high pressure ICE. The measured experimental data to characterize engine performance of the single cylinder variable compression ratio diesel engine used in a previous study, El-Kassaby and Nemit-allah [Mohammed EL-Kasaby, Medhat A. Nemit-allah, Experimental investigations of ignition delay period and performance of a diesel engine operated with Jatropha oil biodiesel, Alexandria Engineering Journal 2013, 52, 141-149 incorporated herein by reference], are utilized to explain the present numerical study. In the work by El-Kassaby and Nemitallah, the ignition delay period and engine performance of a single cylinder diesel engine are investigated considering pure diesel fuel and blends of diesel and Jatropah oil biodiesel fuels. Only the data of engine performance using pure diesel as a fuel are considered in the present numerical study. The necessary air flow rate to power the single cylinder diesel engine to produce a certain targeted power was recorded in the experiments. As air contains mainly oxygen plus nitrogen, the oxygen flow rate needed to power the engine is calculated and, instead of nitrogen, a mixture of recirculated gases is used as sweep gas in the ITM unit to extract ore oxygen through the ITM and as energy carrier I the ICE to control the temperature.

Figure 5:
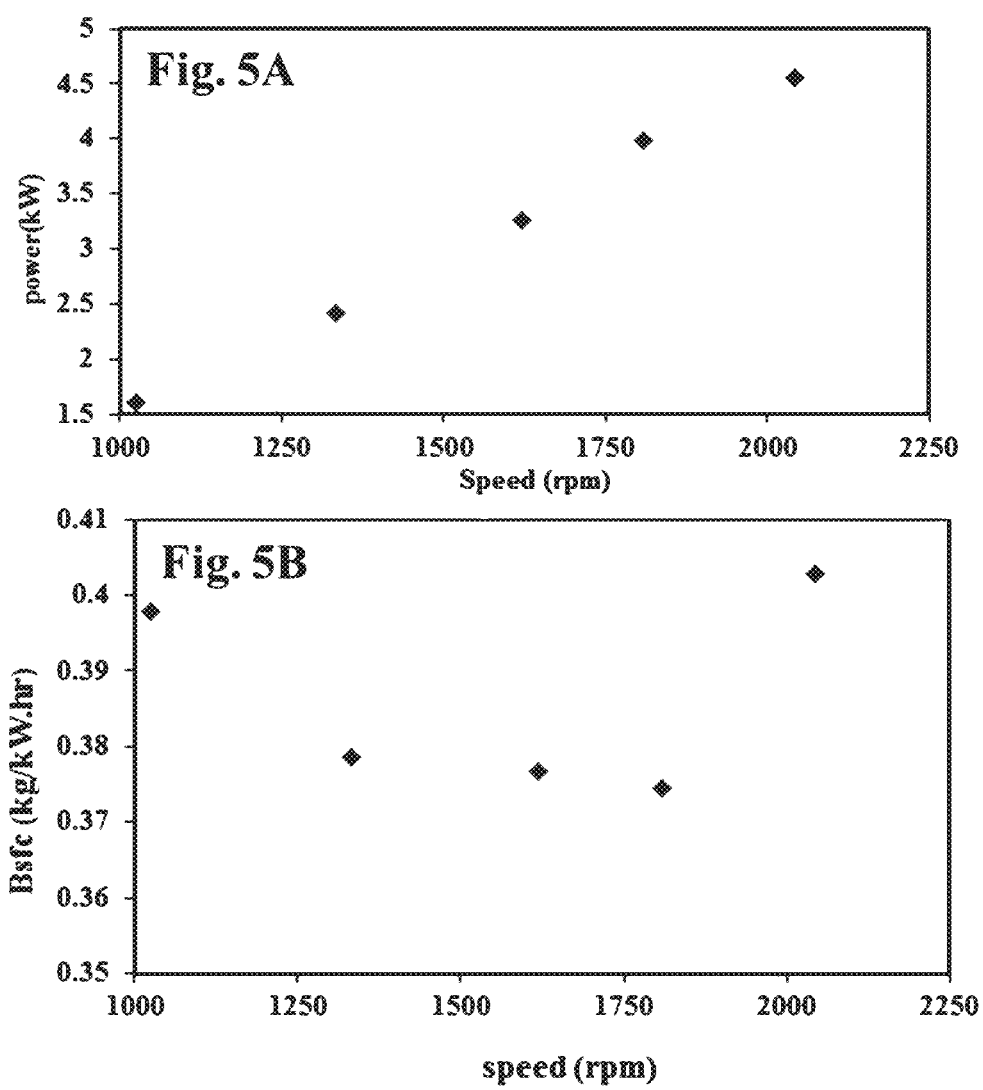
FIG. 5A represents an engine power as function of engine speed at full load conditions for a pure diesel fuel.
FIG. 5B represents an engine BSCF (Brake Specific Fuel Consumption) as function of engine speed at full load conditions for a pure diesel fuel.

FIGS. 5A and 5B shows the distributions of power produced by the single cylinder diesel engine and brake specific fuel consumption (bsfc) as functions of engine speed considering pure diesel fuel [Mohammed EL-Kasaby, Medhat A. Nemit-allah, Experimental investigations of ignition delay period and performance of a diesel engine operated with Jatropha oil biodiesel, Alexandria Engineering Journal 2013, 52, 141-149]. Just one data point is picked up from this figure and based on the measured data at this point, air flow rate is calculated. The selected point is at engine speed of 1620 revolution per minute (rpm) which corresponds to output power of 3.255 kW and to bsfc of 0.3767 kg/kW/hr. These values of engine performance parameters correspond to a measured air flow rate of 17.5 kg/hr [Mohammed EL-Kasaby, Medhat A. Nemit-allah, Experimental investigations of ignition delay period and performance of a diesel engine operated with Jatropha oil biodiesel, Alexandria Engineering Journal 2013, 52, 141-149]. Based on that, 21% by volume of air is oxygen and 79% by volume is nitrogen, the necessary oxygen flow rate to drive the single cylinder diesel engine to produce power output of 3.255 kW is $1.1326 \times 10^{-3}$ kg/s. Based on that, an ITM can be designed unit to produce this amount of oxygen in order to drive the ICE.

EXAMPLE 10

Structure of the ITM Unit

The aim of the present study is to design an ITM unit for integration with an ICE. The idea is to separate oxygen from air using ITM unit and, then, oxygen is introduced to the ICE. In the present disclosure, fuel is burned using the separated oxygen by the membranes in the ICE, and portion of the combustion products, consisting mainly of $CO_2$ and $H_2O$, is passed in the permeate side within the membrane tubes. FIG. 1C shows the disclosed multi-membrane ITM unit. The ITM unit is of shell and tube design. Air is fed to the ITM unit in the shell side and oxygen is separated from air through the membranes. The recirculated gases ($CO_2$ plus $H_2O$) act as a diluent inside the ICE to control the flame temperature. The stream of the recirculated gases enters into the ITM unit to be passed within the membranes as presented in FIG. 1C. The air enters to the ITM unit through the shell side and flows in the same direction as the recirculated gases stream into the volumes surrounding the ion transport membranes. Air is to fill the volume around the membranes, and the oxygen penetrates from the outside surface to the inside surface of the cylindrical membranes via the mechanism as shown in FIG. 1D. FIG. 6 shows a schematic representation of four adjacent cylindrical membranes in square arrangement. Due to symmetry, quarter of the square representation (hatched zone) of the ITM unit is considered to conduct the numerical simulations in the three-dimensions as presented in FIG. 6.

EXAMPLE 11

Oxygen Permeation Model

Based on the oxygen chemical potential differences between the feed and the permeate sides of the membrane, the surface temperature of the membrane and the membrane ambipolar conductivity, oxygen transfers across the membrane from the high partial pressure feed zone to the low partial pressure permeate side [Hong, J., Kirchen, P., Ghoniem, A. F., Interactions between oxygen permeation and homogeneous-phase fuel conversion on the sweep side of an ion transport membrane, Journal of membrane science 2013, 428, 309-322—incorporated herein by reference]. The transport process consists of surface exchange of oxygen atoms on both sides of the membrane (this process depends on the membrane temperature and the activation energy) and bulk diffusion (this process depends on the ionic conductivity, chemical potential gradient and membrane temperature) across the membrane surface. Oxygen permeation through a dense mixed ionic-electronic conducting material is limited by surface exchange resistance, bulk diffusion limitations, or both [Habib, M. A., Nemitallah, M. A., Ben-Mansour, R., Recent development in oxy-combustion technology and its applications to gas turbine ITM assemblys and ITM reactors, Energy and fuels 2013, 27, 2-19—incorporated herein by reference]. It should be noted that the bulk diffusion will be the controlling step when the membrane is relatively thick. The extensively used oxygen permeation equation by Xu and Thomson [Xu, S. J., Thomson, W. J., Oxygen permeation rates through ion-conducting perovskite membranes, Chemical engineering science 1999, 54, 3839-3850—incorporated herein by reference] in the literature does not consider the effects of Reynolds number (flow rates) and sub-step reaction on membrane both surfaces on oxygen permeation flux. The equation by Xu and Thomson is derived for mixed ionic electronic conducting ceramics based on the following assumptions: (1) higher electronic conductivity than the ionic conductivity in perovskites; (2) constant concentrations of electron hole on both surfaces of the membrane; (3) oxygen vacancy diffusion coefficient is only function of temperature (not function of position); and (4) non sub-step surface reactions are considered on both sides of the membrane. Based on these assumptions, the oxygen permeation equation can be expressed as follows:

$$J_{O2} = \frac{(k_r/k_f)[(1/P_{O2}'^{0.5}) - (1/P_{O2}''^{0.5})]}{[1/(k_f P_{O2}'^{0.5})] + [2L/D_v] + [1/(k_f P_{O2}''^{0.5})]} \quad (1)$$

where P'o₂ and P"o₂ are oxygen partial pressure in feed and permeate sides, respectively. The coefficients $D_v$ and $k_f$ and $k_r$ represent the diffusion coefficient, forward and reverse reaction rate constants, respectively. These coefficients can be presented in the form of Arrhenius type equations as follows [Nemitallah, M. A Habib, M. A., Ben-Mansour, R., Investigations of oxy-fuel combustion and oxygen permeation in an ITM reactor using a two-step oxy-combustion reaction kinetics model, Journal of membrane science 2013, 432, 1-12—incorporated herein by reference]:

$$D_v = D_v^0 \exp\left(\frac{-E_D}{RT}\right) \quad (2)$$

$$k_f = k_f^0 \exp\left(\frac{-E_f}{RT}\right) \quad (3)$$

$$k_r = k_r^0 \exp\left(\frac{-E_r}{RT}\right) \quad (4)$$

where $D°_v$, $k°_f$ and $k°_r$ are the pre-exponential coefficients and, $E_D$, $E_f$ and $E_r$ are the activation energies. However, the above oxygen permeation equation cannot predict accurately the oxygen permeation flux. The equation should be modified in order to take into account the effects of sub-step surface reactions and feed and sweep flow rates [Behrouzifar, A., Atabak, A. A., Mohammadi, T. Pak, A., Experimental investigation and mathematical modeling of oxygen permeation through dense $Ba_{0.5}Sr_{0.5}Co_{0.8}Fe_{0.2}O_{3-\delta}$ (BSCF) perovskite-type ceramic membranes, Ceramics international 2012, 38, 4797-4811—incorporated herein by reference].

Based on the above oxygen permeation equation, the oxygen vacancies concentrations on both membrane surfaces are controlled by the surface exchange kinetics of the following elementary surface reactions:

The parameter $O^x_O$ represents the lattice oxygen in the perovskite crystal structure. However, these two reactions are no longer elementary as they include many sub-step reactions, like dissociation, oxygen adsorption, charge transfer, recombination and bulk diffusion [Ghadimi, A., Alaee, M. A., Behrouzifar, A., Asadi, A. A., Mohammadi, T., Oxygen permeation of $Ba_xSr_{1-x}Co_{0.8}Fe_{0.2}O_{3-\delta}$ perovskite-type membrane: experimental and modeling. Desalination 2011, 270, 64-75—incorporated herein by reference]. Based on the assumption of constant electron hole concentration on both sides of the membrane, the reverse reaction rate of reaction A (forward reaction rate of reaction B) are of zero order. However, the effect of sub-step reactions can be considered in terms of oxygen partial pressure and oxygen vacancy. But, the consideration of sub-step reaction order for oxygen vacancy will result in implicit oxygen permeation equation. Thus, the effect of sub-step reaction order can be considered in terms of oxygen partial pressure and, accordingly, the oxygen permeation equation can be presented as follows [Behrouzifar, A., Atabak, A. A., Mohammadi, T., Pak, A., Experimental investigation and mathematical modeling of oxygen permeation through dense $Ba_{0.5}Sr_{0.5}Co_{0.8}Fe_{0.2}O_{3-\delta}$ (BSCF) perovskite-type ceramic membranes, Ceramics international 2012, 38, 4797-4811—incorporated herein by reference]:

$$J_{O2} = \frac{(k_r/k_f)[(1/P_{O2}'^n) - (1/P_{O2}''^n)]}{[1/(k_f P_{O2}'^n)] + [2L/D_v] + [1/(k_f P_{O2}''^n)]} \quad (5)$$

Equation (5) can be used with reasonable accuracy for oxygen permeation; however, this accuracy can be improved if the effects of feed and sweep flow rates are take into account. Oxygen partial pressure in feed and sweep sides is a direct function of feed and sweep flow rates (Reynolds number in both sides). Thus, the effects of flow rates can be considered in terms of modified oxygen partial pressure in both sides of the membrane. The modified oxygen partial pressure should be function of Reynolds number [Ghadimi, A., Alaee, M. A., Behrouzifar, A., Asadi, A. A., Mohammadi, T., Oxygen permeation of $Ba_xSr_{1-x}Co_{0.8}Fe_{0.2}O_{3-\delta}$ perovskite-type membrane: experimental and modeling, Desalination 2011, 270, 64-75—incorporated herein by reference]. Based on considering different functions of oxygen partial pressure and comparisons with their experimental measurements of a BSCF membrane, Behrouzifar et al. [Behrouzifar, A., Atabak, A. A., Mohammadi, T., Pak, A., Experimental investigation and mathematical modeling of oxygen permeation through dense $Ba_{0.5}Sr_{0.5}Co_{0.8}Fe_{0.2}O_{3-\delta}$ (BSCF) perovskite-type ceramic membranes, Ceramics international 2012, 38, 4797-4811—incorporated herein by reference] introduced the following forms for modified partial pressure of oxygen in membrane feed and sweep sides:

$$P'^*_{O2} = (a' + b' Re'^{c'}) P'_{O2} \quad (6)$$

$$P''^*_{O2} = (a'' + b'' Re''^{c''}) P''_{O2} \quad (7)$$

Where:

$$Re' = q'/(\pi v' \lambda') \quad (8)$$

$$Re'' = q''/(\pi v'' \lambda'') \quad (9)$$

where a, b, c are constants calculated based on the fittings with the available experimental data. Those constants account for the effect of flow rate on oxygen partial pressure on both sides of the membrane to correctly predict the oxygen permeation flux. The values of the constants a, b and c are listed in Table 2. The terms q, v and λ are volumetric flow rate, kinematic viscosity and distance between air entrance and membrane surface, respectively. Equations 8 and 9 are substituted in equations 6 and 7 respectively to calculate the modified oxygen partial pressure values. Based on the above expressions, the modified oxygen permeation equation can be expressed as follows [Behrouzifar, A., Atabak, A. A., Mohammadi, T., Pak, A., Experimental investigation and mathematical modeling of oxygen permeation through dense $Ba_{0.5}Sr_{0.5}Co_{0.8}Fe_{0.2}O_{3-\delta}$ (BSCF) perovskite-type ceramic membranes, Ceramics international 2012, 38, 4797-4811]:

$$J_{O2} = \frac{(k_r/k_f)[(1/P_{O2}'^{n'}) - (1/P_{O2}''^{n'})]}{[1/(k_f P_{O2}'^{n''})] + [2L/D_v] + [1/(k_f P_{O2}''^{n''})]} \quad (10)$$

TABLE 2

Oxygen permeation model parameters [Behrouzifar, A., Atabak, A. A., Mohammadi, T., Pak, A., Experimental investigation and mathematical modeling of oxygen permeation through dense $Ba_{0.5}Sr_{0.5}Co_{0.8}Fe_{0.2}O_{3-\delta}$ (BSCF) perovskite-type ceramic membranes, Ceramics international 2012, 38, 4797-4811].

| Parameter | unit | value |
|---|---|---|
| $D°_v$ | m$^2$/s | $5.9807 \times 10^{-5}$ |
| $k°_f$ | m/atm$^n$/s | 41.688 |
| $k°_r$ | mol/m$^2$/s | $1.166 \times 10^4$ |
| $E_D$ | J/mol | $9.2709 \times 10^4$ |
| $E_f$ | J/mol | $1.4668 \times 10^5$ |
| $E_r$ | J/mol | $1.0291 \times 10^5$ |
| n | — | 0.25 |
| a' | — | 0.1015 |
| b' | — | 1.8687 |
| c' | — | 0.4525 |
| a" | — | 0.1891 |
| b" | — | 9.3439 |
| c" | — | 0.132 |

EXAMPLE 12

CFD Modeling

Due to the symmetry of the ITM unit, quarter of the square membrane cell is considered for simulation in the three dimensions. The commercial Gambit 2.2 software was used to construct the mesh. Very fine mesh cells were considered in the vicinity of the membrane in both sides. A mesh independency study was performed. The generated mesh was read by the CFD fluent 12.1 commercial software. Fluent was used to solve the steady flow mass, momentum, energy and species conservation equations while considering laminar flow regime. The equations can be presented as follows [Nemitallah, M. A., Habib, M. A., Mezghani, K., Experimental and numerical study of oxygen separation and oxy-combustion characteristics inside a button-cell LNO-ITM reactor. Energy 2015, 84, 600-611—incorporated herein by reference]:

$$\nabla \cdot (\rho U) = S_i \quad (11)$$

$$\nabla \cdot (\rho U U) = -\nabla P + \mu \nabla^2 U \quad (12)$$

$$(\rho C_P) U \cdot \nabla T = \nabla \cdot (\lambda \nabla T) \quad (13)$$

$$\nabla \cdot (\rho U Y_i) - \nabla \cdot (\rho D_{i,m} \nabla Y_i) = S_i \quad (14)$$

where U represents the flow velocity and $S_i$ is a source/sink term to account for the transfer of oxygen through the membrane bulk. The parameters $\lambda$, $D_{i,m}$ and $Y_i$ represent thermal conductivity, diffusion coefficient and species mass fraction, respectively. The source/sink term can be presented as function of the calculated oxygen permeation flux based on equation (10) as follows:

$$S_i = \frac{J_{O2} \cdot A_{cell} \cdot MW_{O2}}{V_{cell}} \text{ at membrane permeate side, and} \quad (15)$$

$$S_i = \frac{J_{O2} \cdot A_{cell} \cdot MW_{O2}}{V_{cell}} \text{ at membrane feed side}$$

where, $J_{O2}$ is defined as the oxygen flux through the membrane in mol/m$^2$/s, $MW_{O2}$ is the oxygen molecular weight and $A_{cell}$ and $V_{cell}$ are the area and volume of the cell, respectively. This term is a sink term is feed zone (disappears) of the membrane and a sink term in the permeate side (appears). This term is applied only to the membrane boundary cells and it is zero elsewhere in the computational domain. Also, the term is applied only to oxygen and it is zero for other species. However, fluent software alone cannot account for oxygen permeation across the membrane. Instead, a series of user defined functions (UDFs) were written in visual C++ and compiled and hooked to the fluent software. The UDFs modify only in the source term in the conservation equation for only oxygen molecules and only to the cells in contact with the membrane surface in both sides. The membrane surface was considered as a grey body with an emissivity of 0.8 and a thermal conductivity of 4 W/m/K [Nemitallah, M. A., Habib, M. A., Mezghani, K., Experimental and numerical study of oxygen separation and oxy-combustion characteristics inside a button-cell LNO-ITM reactor. Energy 2015, 84, 600-611]. Due to its stability while performing the calculations the semi-implicit method for pressure-linked equations (SIMPLE) algorithm was applied to account for coupling between pressure and velocity fields [Patankar, S. V., Numerical heat transfer and fluid flow, Hemisphere publishing corporation 1980, Washington D.C.]. The second order upwind scheme was used to discretize the convective terms in the conservation equations. The solution was carefully monitored and the solution was considered converged when the residuals of all variables were dropped below 10$^{-6}$.

Radiation heat transfer modeling should be modeled in ITM simulations in order to control temperature. The discrete ordinate (DO) radiation model was applied in order to solve for the radiative transfer equation (RTE). In order to correctly predict the temperature, the radiation heat transfer vector gradient is calculated and substituted in the conservation equation of energy once the radiation intensity is calculated. Species transport model was applied to account for mass fractions distributions within the computational domain.

Figure 7:
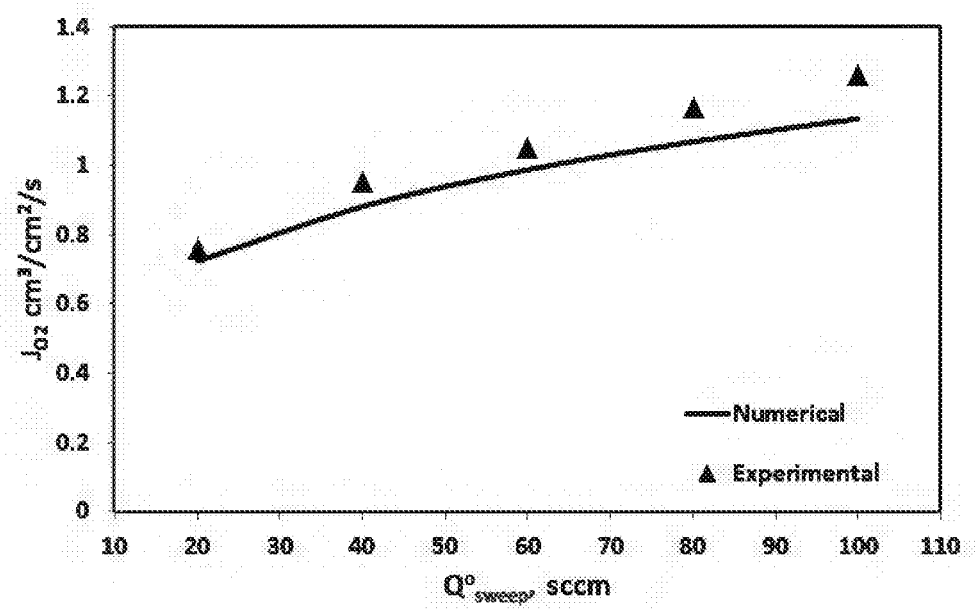
FIG. 7 represents a comparison of an oxygen permeation flux as function of sweep flux rate, when numerical results [Nemitallah, M. A., A study of methane oxy-combustion characteristics inside a modified design button-cell membrane reactor utilizing a modified oxygen permeation model for reacting flows, Journal of Natural Gas Science and Engineering 2016, 28, 61-73] are compared to experimental results [Behrouzifar, A., Atabak, A. A., Mohammadi, T., Pak, A., Experimental investigation and mathematical modeling of oxygen permeation through dense $Ba_{0.5}Sr_{0.5}Co_{0.8}Fe_{0.2}O_{3-\delta}$ (BSCF) perovskite-type ceramic membranes, Ceramics international, 2012, 38, 4797-4811].

The model is validated based on the experimental measurements by Behrouzifar et al. [Behrouzifar, A., Atabak, A. A., Mohammadi, T., Pak, A., Experimental investigation and mathematical modeling of oxygen permeation through dense $Ba_{0.5}Sr_{0.5}Co_{0.8}Fe_{0.2}O_{3-\delta}$ (BSCF) perovskite-type ceramic membranes, Ceramics international 2012, 38, 4797-4811] and very good agreement with the experimental data was obtained as shown in FIG. 7. The details of the validation study can be found in our previous work, Nemitallah [Nemitallah, M. A., A study of methane oxy-combustion characteristics inside a modified design button-cell membrane reactor utilizing a modified oxygen permeation model for reacting flows, Journal of Natural Gas Science and Engineering 2016, 28, 61-73].

EXAMPLE 13

Operating Conditions of the ITM Unit

As mentioned above, one data point is selected from the measured data of engine performance. The selected point is at engine speed of 1620 revolution per minute (rpm) which corresponds to output power of 3.255 kW and to bsfc of 0.3767 kg/kW/hr. These values of engine performance parameters correspond to a measured air flow rate of 17.5 kg/hr [Mohammed EL-Kasaby, Medhat A. Nemit-allah, Experimental investigations of ignition delay period and performance of a diesel engine operated with Jatropha oil biodiesel, Alexandria Engineering Journal 2013, 52, 141-149]. Based on that 21% by volume of air is oxygen and 79% by volume is nitrogen, the amount of oxygen flow rate to drive the single cylinder diesel engine to produce power output of 3.255 kW is $1.1326 \times 10^{-3}$ kg/s. Based on that, an ITM unit can be designed to produce this amount of oxygen in order to drive the ICE. In all considered cases for numerical simulations, the exhaust gases out of the ICE are recirculated to the permeate side inlet of the ITM unit at temperature of 900° C. The exhaust gases introduced to the permeate side of each membrane unit consist of $CO_2$ and $H_2O$ plus small fraction of methane. Based on previous numerical results [Nemitallah, M. A., Habib, M. A., Ben-Mansour, R., Ghoniem, A. F., Design of an ion transport membrane reactor for gas turbine combustion application, Journal of membrane science 2014, 450, 60-71; Habib, M. A., Nemitallah, M. A Design of an ion transport membrane reactor for application in fire tube boilers, Energy 2015, 81, 787-801] and in the works done by Mancini ad Mitsos [Mancini N., Mitsos, A., Ion transport membrane reactors for oxy-combustion Part II: Analysis and comparison of alternatives, Energy 2011, 36, 4721-4739; Mancini N., Mitsos, A., Ion transport membrane reactors for oxy-combustion e Part I: intermediate fidelity Modeling, Energy 2011, 36, 4701-4720], the dimensions and the flow rates in feed and permeate sides of each cylindrical membrane are specified. In addition, detailed numerical study is performed considering nine simulation cases to determine the design and flow conditions as presented in Table 3.

EXAMPLE 14

Co-current Vs. Counter-current Flow Configurations

Figure 8:
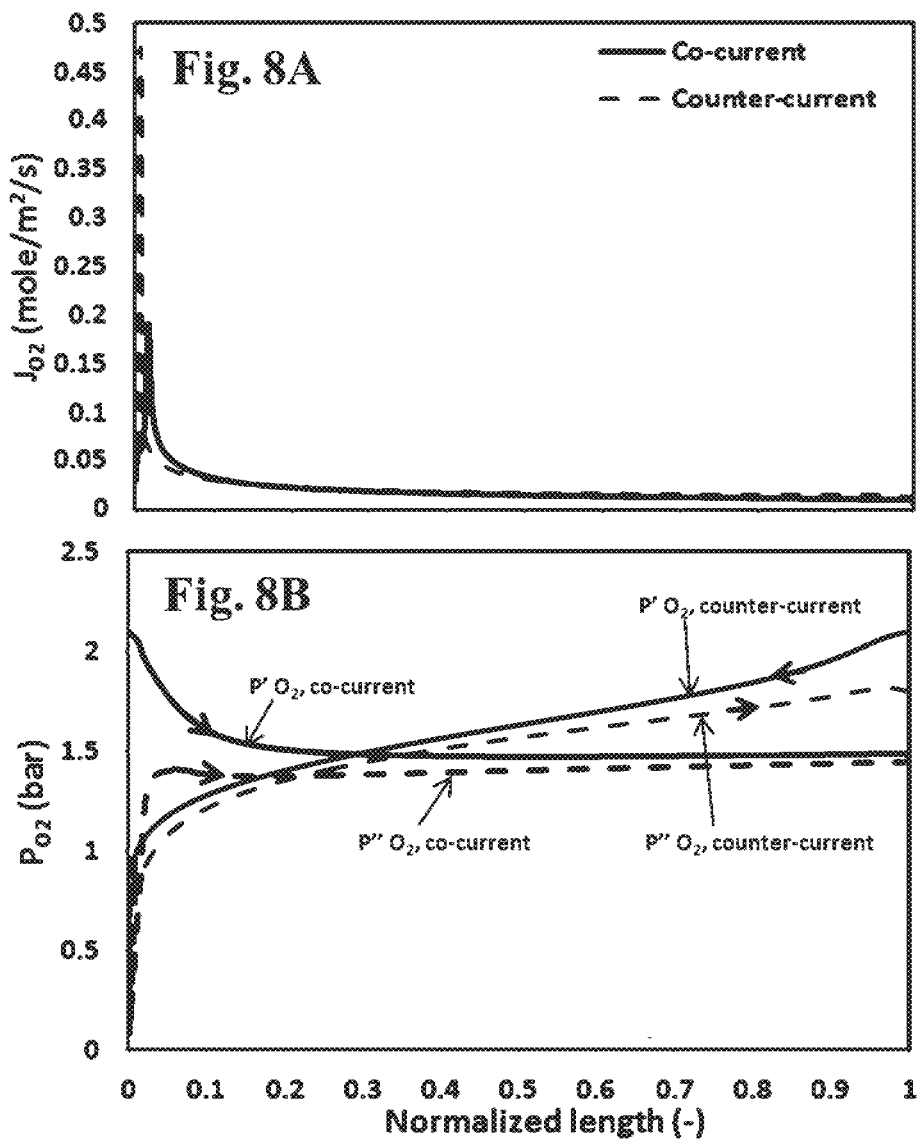
FIG. 8A represents an axial distribution of the oxygen permeation flux of the ion transport membrane assembly, when the flow of the feed zone is co-current and counter-current relative to the flow of the permeate zone.
FIG. 8B represents an axial distribution of the oxygen partial pressure in the feed and the permeate zones of the ion transport membrane assembly, when the flow of the feed zone is co-current and counter-current relative to the flow of the permeate zone.

FIGS. 8A and 8B shows the effect of flow configuration, co-current (case 3) and counter-current (case 1), on the axial distributions of: (a) oxygen permeation flux and (b) oxygen partial pressure in feed and permeate sides of the membrane. More uniform oxygen permeation flux is encountered in case of co-current flow configuration. Also, the partial pressure differences are higher in case of co-current as compared to counter-current flow configuration as shown in FIGS. 8A and 8B. So, the co-current flow configuration has better characteristics than counter-current flow configuration. Based on that, the numerical calculations of the operating and design conditions of the ITM unit are performed considering co-current flow configuration.

EXAMPLE 15

Effect of Inlet Fuel Concentration

Figure 9:
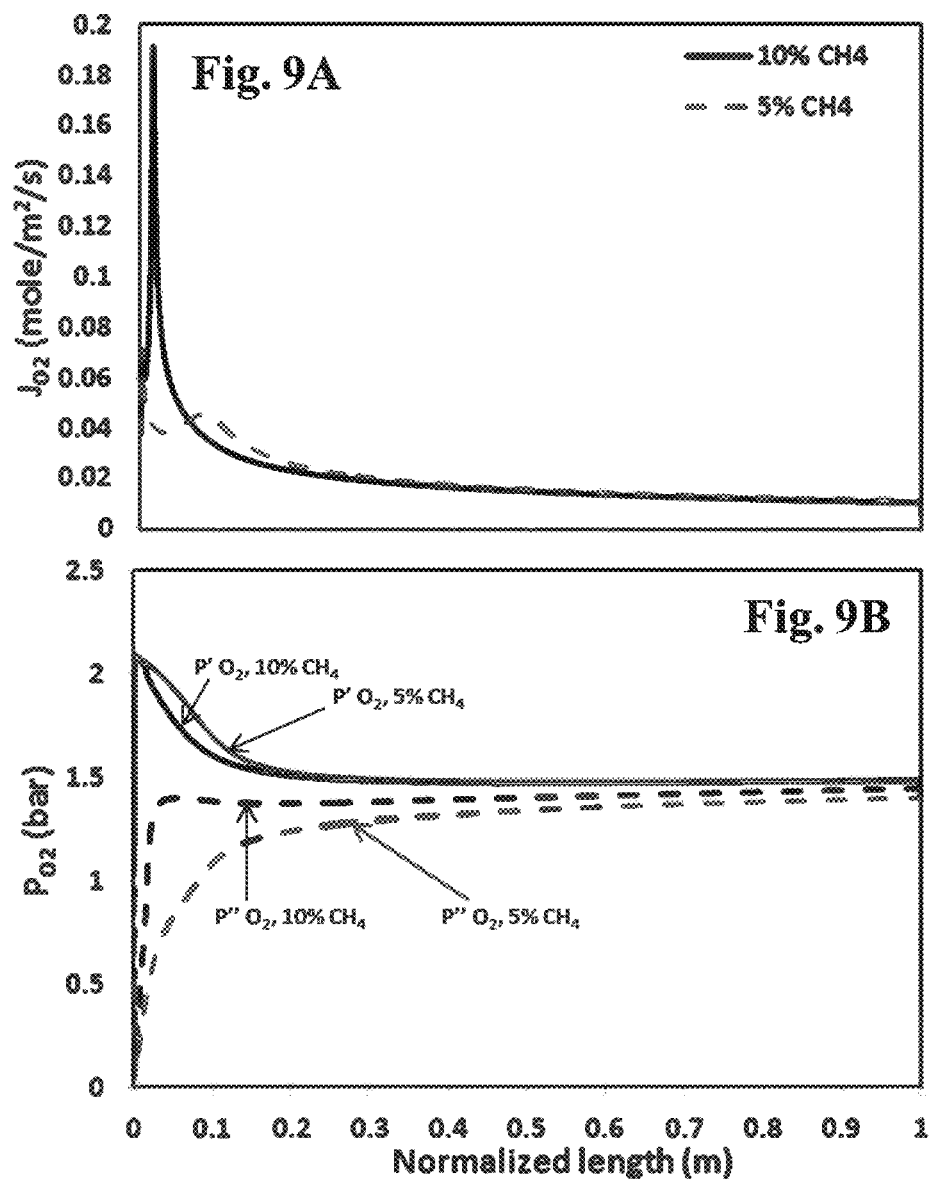
FIG. 9A represents an axial distribution of the oxygen permeation flux of the ion transport membrane assembly, when a fuel stream includes 5% and 10% $CH_4$.
FIG. 9B represents an axial distribution of the oxygen partial pressure in the feed and the permeate zones of the ion transport membrane assembly, when the fuel stream includes 5% and 10% $CH_4$.

Effects of inlet fuel concentration, 5% $CH_4$ (case 4) and 10% $CH_4$ (case 3), on the axial distributions of: (a) oxygen permeation flux and (b) oxygen partial pressure in feed and permeate sides of the membrane are presented in FIGS. 9A and 9B. Accordingly, the uniformity of oxygen permeation flux is better at lower fuel concentrations. It's also preferred to lower the amount of fuel at membrane unit inlet as the main fuel is injected in the ICE.

EXAMPLE 16

Effect of Membrane Tube Length

Figure 10:
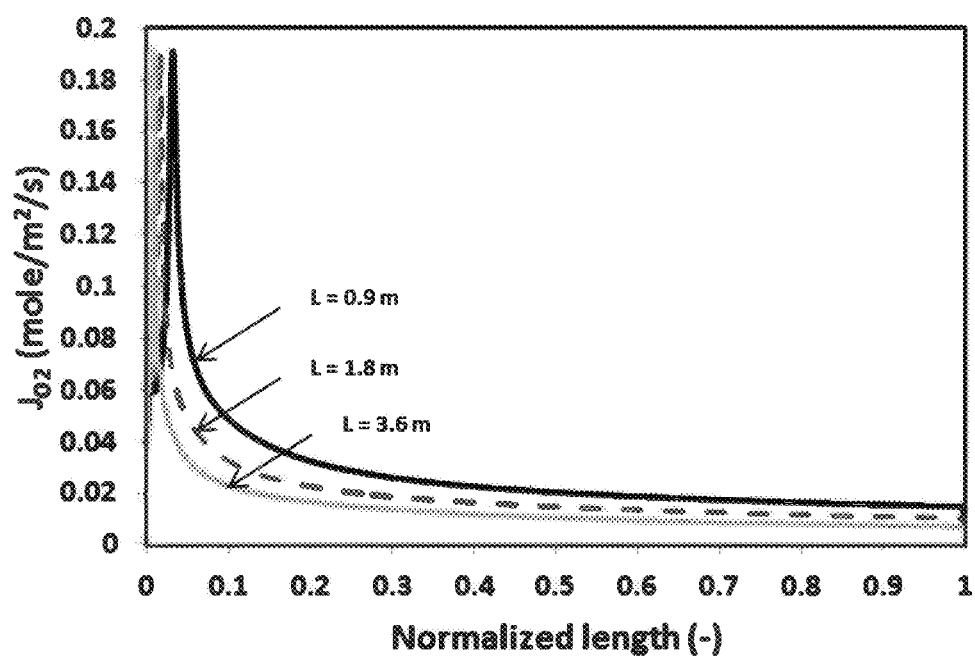
FIG. 10 represents an axial distribution of the oxygen permeation flux of the ion transport membrane assembly, at different lengths of the ion transport membranes.

Oxygen permeation flux was calculated considering three different values of membrane length including 0.9 m, 1.8 m and 3.6 m as presented in FIG. 10. The membrane unit with a length of 0.9 m resulted in the highest average oxygen

TABLE 3

Representation of flow and design conditions for all simulation cases.

| | \multicolumn{9}{c}{Case} |
|---|---|---|---|---|---|---|---|---|---|
| | 1 | 2 | 3 (base) | 4 | 5 | 6 | 7 | 8 | 9 |
| Flow configuration | Counter current | | | Co-current | | | | | |
| Inlet temperature [K] | | | 1173 | | | | | | |
| Feed air flow rate [kg/s/cell] | | | $2.961 \times 10^{-3}$ | | | | | | |
| Pitch [mm] | | | 22 | | | | | 18 | 22 |
| Membrane tube diameter [mm] | | | 17 | | | | | 10 | 24 |
| Membrane length [m] | | | 1.8 | | 0.9 | 3.6 | 1.8 | | |
| Total permeate flow rate [kg/s/cell] | $2.576 \times 10^{-4}$ | $5.152 \times 10^{-4}$ | $2.576 \times 10^{-4}$ | $5.152 \times 10^{-4}$ | | $2.576 \times 10^{-4}$ | | | |
| Volume fractions of permeate flow | 10% $CH_4$ 45% $CO_2$ 45% $H_2O$ | 5% $CH_4$ 47.5% $CO_2$ 47.5% $H_2O$ | 10% $CH_4$ 45% $CO_2$ 45% $H_2O$ | 5% $CH_4$ 47.5% $CO_2$ 47.5% $H_2O$ | | 10% $CH_4$ 45% $CO_2$ 45% $H_2O$ | | | | permeation flux. On average, 0.03 mol/m²/s of oxygen flux is permeated across the membrane for the case of 1.8 m of membrane length.

EXAMPLE 17

Effect of Membrane Tube Diameter

Effects of membrane diameter on distributions of oxygen permeation flux and oxygen partial pressure are also examined considering different values of membrane diameter including 10 mm, 17 mm and 24 mm, and the results are presented in FIGS. 11A and 11B. For membrane diameter of 17 mm, the oxygen permeation flux was the highest among all tested membrane diameters as shown in the figure.

EXAMPLE 18

Effect of Membrane Tube Pitch

Figure 12:
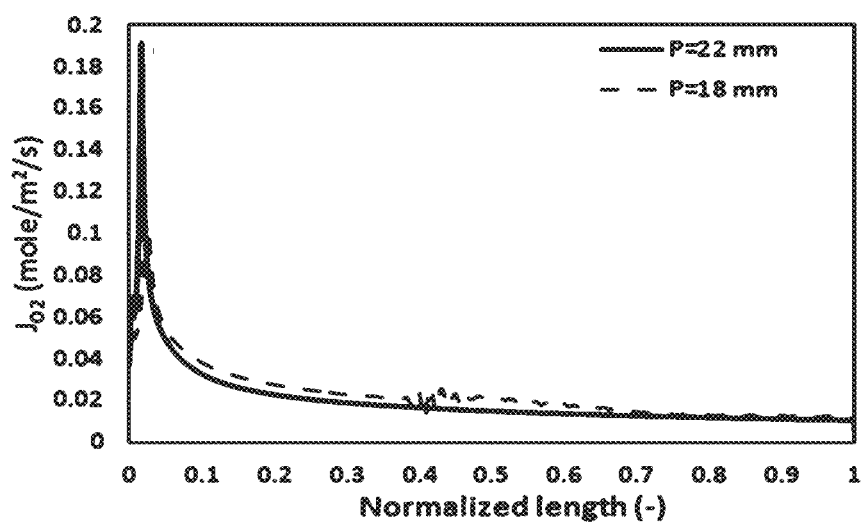
FIG. 12 represents an axial distribution of the oxygen permeation flux of the ion transport membrane assembly, at different inter-membrane (pitch) sizes of the ion transport membranes.

Influence of pitch distance between membrane tubes including P=18 mm (case 7) and P=22 mm (case 3) on the axial distributions of oxygen permeation flux is presented in FIG. 12. Better permeation flux is obtained for the case of 22 mm membrane pitch.

EXAMPLE 19

Based on the above numerical results, case (4) revealed a desired mass flux of oxygen. A flow rate of $5.15212 \times 10^{-4}$ kg/s is introduced to each membrane cell at the permeate side with volumetric concentrations of 5%, 47.5% and 47.5% for methane, $CO_2$ and $H_2O$, respectively. Air (21% oxygen and 79% nitrogen) is fed to the shell side of the membrane unit at flow rate of $2.960619 \times 10^{-3}$ kg/s for each membrane cell. Each cylindrical membrane has a diameter of 17 mm and a length of 1.8 m with membrane pitch of 22 mm. The contour plots of oxygen mass fractions on planes normal to flow direction at different axial locations, (a) Z=0.4 m, (b) Z=0.8 m, (c) Z=1.2 m and (d) Z=1.6 m, for the preferred design case (case 4) are presented in FIGS. 13A, 13B, 13C, and 13D. On average, the permeated oxygen flux in this case is 0.03 mol/m²/s. So, for each membrane cell, a total permeation flow rate of oxygen of $2.88252 \times 10^{-3}$ mol/s is obtained corresponding to $9.22404 \times 10^{-5}$ kg/s. However, the amount of oxygen to operate a single cylinder diesel engine at speed of 1620 rpm to produce output power of 3.255 kW is $1.1326 \times 10^{-3}$ kg/s. Based on that, a total number of 12.3 membrane cells (13 membrane tubes) with length of 1.8 m are needed to produce the specified amount of oxygen to fully burn diesel fuel in the single cylinder diesel engine.

The invention claimed is:

1. A method of combusting a fuel stream comprising:
delivering an oxygen-containing stream to a feed zone of an ion transport membrane assembly, wherein molecular oxygen present in the oxygen-containing stream is transported across a plurality of ion transport membranes to a plurality of permeate zones of the ion transport membrane assembly;
delivering the molecular oxygen present in the plurality of permeate zones to a combustion chamber;
delivering the fuel stream to the combustion chamber to combust the fuel stream with the molecular oxygen to form an exhaust stream comprising carbon dioxide and water vapor;
heat exchanging the oxygen-containing stream with the exhaust stream via a heat exchanger, prior to delivering the oxygen-containing stream to the feed zone;
flowing a portion of the exhaust stream comprising carbon dioxide and optionally water vapor into the plurality of permeate zones of the ion transport membrane assembly to form an oxygen-enriched stream comprising the molecular oxygen, carbon dioxide, and optionally water vapor; and
delivering the oxygen-enriched stream to the combustion chamber.

2. The method of claim 1, further comprising:
mixing the oxygen-enriched stream with the fuel stream to form a combustion mixture; and
delivering the combustion mixture to the combustion chamber.

3. The method of claim 1, wherein carbon dioxide and water vapor are present in the exhaust stream, and the method further comprises:
cooling the exhaust stream via a condenser to form a liquid phase in the exhaust stream;
separating the liquid phase from the exhaust stream to form a $CO_2$ stream and a water stream; and
flowing a portion of the $CO_2$ stream into the plurality of permeate zones to form the oxygen-enriched stream comprising the molecular oxygen and carbon dioxide.

4. The method of claim 1, further comprising:
expanding the exhaust stream in an expander to generate power.

5. The method of claim 1, wherein the exhaust stream is flowed into the plurality of permeate zones in a direction counter-current to the flow of the oxygen-containing stream in the feed zone.

6. The method of claim 1, wherein the exhaust stream is flowed into the plurality of permeate zones in a direction co-current to the flow of the oxygen-containing stream in the feed zone.

7. The method of claim 1, wherein an oxygen-depleted stream having a pressure in the range of 1 to 10 bars egresses the feed zone, and the method further comprises
expanding the oxygen-depleted stream in an expander to generate power.

8. A combustion system, comprising:
an ion transport membrane assembly comprising
a vessel with an internal cavity, and
a plurality of ion transport membranes that separate the internal cavity into a feed zone and a plurality of permeate zones, wherein the feed zone has a feed inlet and a feed outlet and each permeate zone has a sweep inlet and a sweep outlet;
a combustion chamber comprising
an oxygen inlet,
a fuel inlet, and
at least one exhaust outlet,
wherein the combustion chamber is located downstream of and fluidly connected to the sweep outlet of the plurality of permeate zones via an oxygen line;
a recycle line that fluidly connects the at least one exhaust outlet to the sweep inlet of the plurality of permeate zones; and
a turbocharger comprising
a compressor fluidly connected to the oxygen line, wherein the compressor is located downstream of the sweep outlet of the plurality of permeate zones and upstream of the oxygen inlet of the combustion chamber, and a turbine fluidly connected to the at least one exhaust outlet via an exhaust line, wherein the compressor and the turbine are coupled via a shaft.

9. The combustion system of claim 8, further comprising:
at least one compartment;
at least one piston slidably disposed inside the at least one compartment;
a crack shaft coupled to the at least one piston;
a plurality of apertures disposed on the at least one compartment to fluidly connect said compartment to the combustion chamber; and
a plurality of valves disposed in the plurality of apertures.

10. The combustion system of claim 8, further comprising:
a heat exchanger located upstream of and fluidly connected to the feed inlet of the feed zone via a feed line and downstream of and fluidly connected to the turbine via the exhaust line, wherein the heat exchanger is configured to heat exchange an oxygen-containing stream with the exhaust stream.

11. The combustion system of claim 10, further comprising:
a condenser located downstream of and fluidly connected to the heat exchanger via the exhaust line configured to separate a liquid phase from the exhaust stream; and
a $CO_2$ line that fluidly connects the condenser to the sweep inlet of the plurality of permeate zones.

12. The combustion system of claim 8, wherein the vessel is cylindrical with a first and a second end separated by a side wall along a longitudinal axis of the vessel, and the feed inlet and the sweep inlet of the plurality of permeate zones are located on the first end, and the feed outlet and the sweep outlet of the plurality of permeate zones are located on the second end of the vessel.

13. The combustion system of claim 8, wherein the vessel is cylindrical with a first and a second end separated by a side wall along a longitudinal axis of the vessel, and each of the plurality of ion transport membranes has a longitudinal axis which is substantially parallel to the longitudinal axis of the vessel.

14. The combustion system of claim 8, wherein each of the plurality of ion transport membranes is an elongated tube having a diameter in the range of 5 to 50 mm, a length in the range of 0.5 to 5 m, and a wall thickness in the range of 0.5 to 3.5 mm.

15. The combustion system of claim 8, wherein at least five ion transport membranes are disposed inside the vessel with an inter-membrane distance of at least 10 mm.

* * * * *